A. KNISTROM.
ACCUMULATING MECHANISM FOR CALCULATING MACHINES.
APPLICATION FILED JAN. 8, 1916.
1,285,234.
Patented Nov. 19, 1918.
14 SHEETS—SHEET 3.
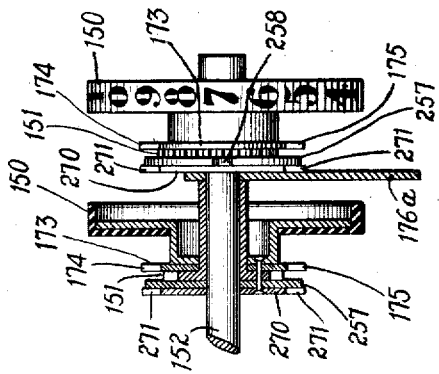
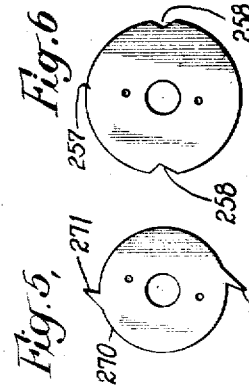
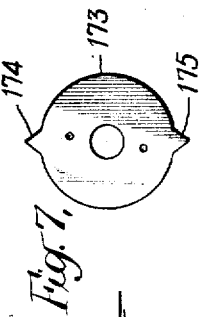
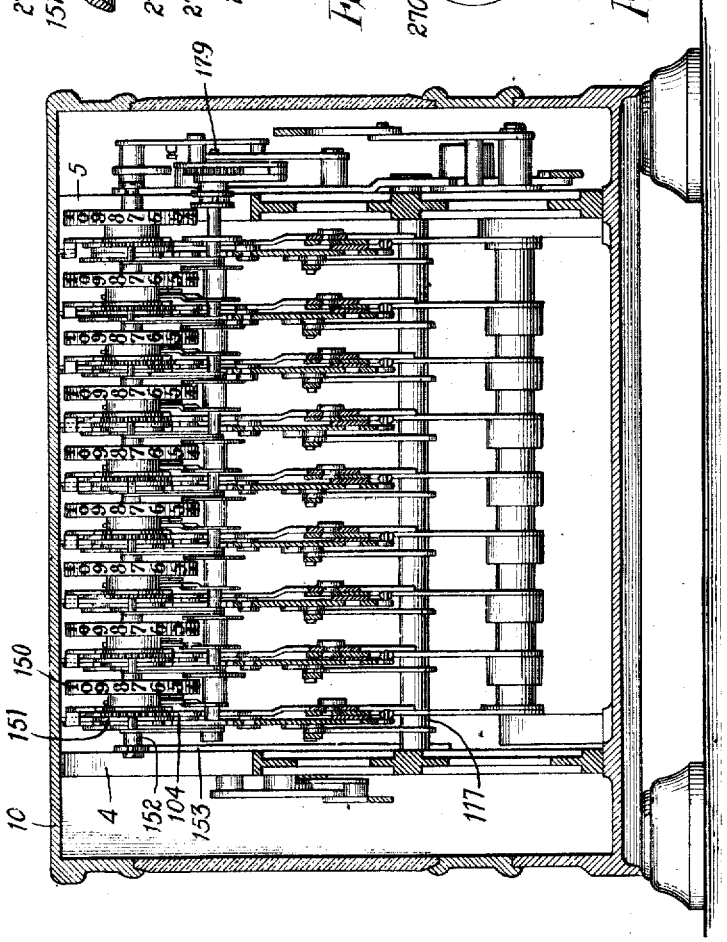
INVENTOR
A. Knistrom,
BY
Kerr, Page, Cooper & Hayward
his ATTORNEYS

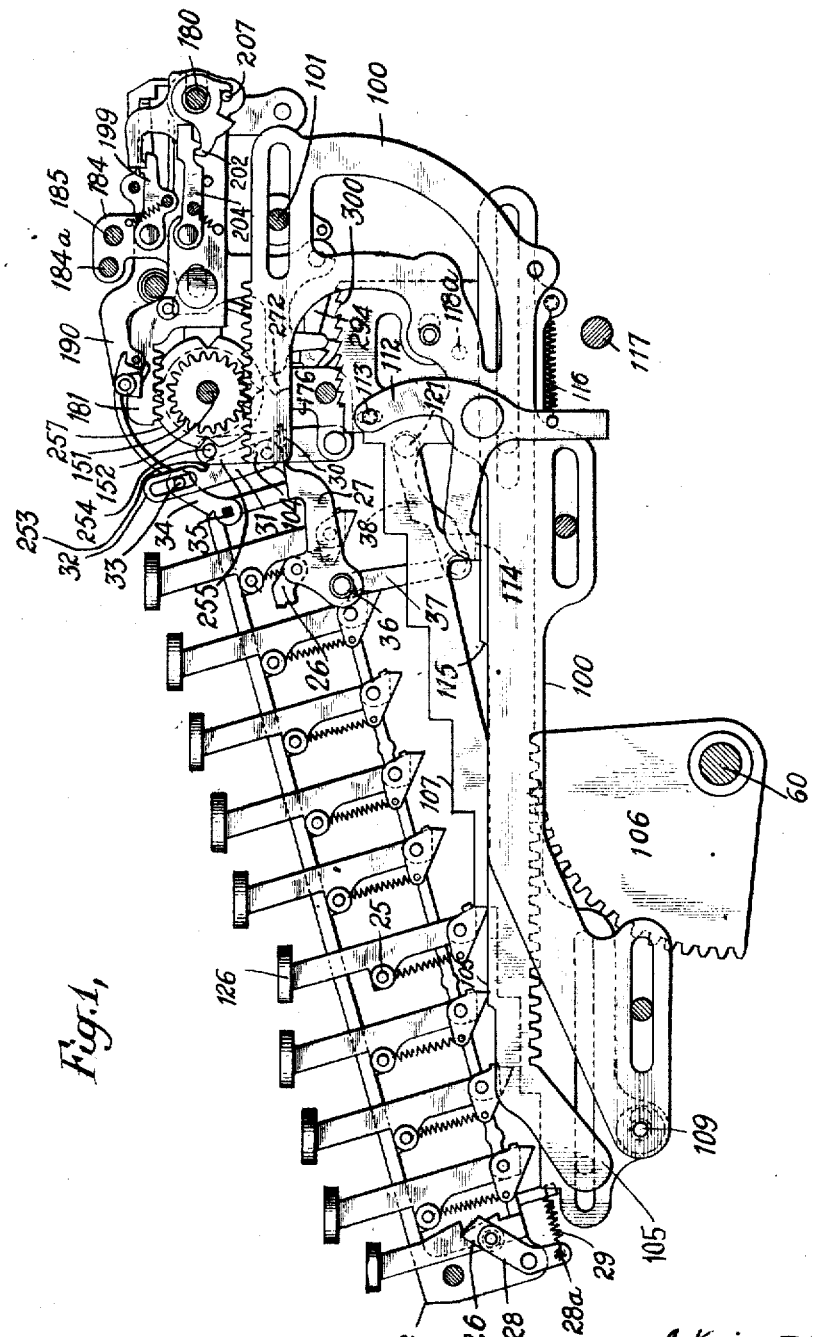

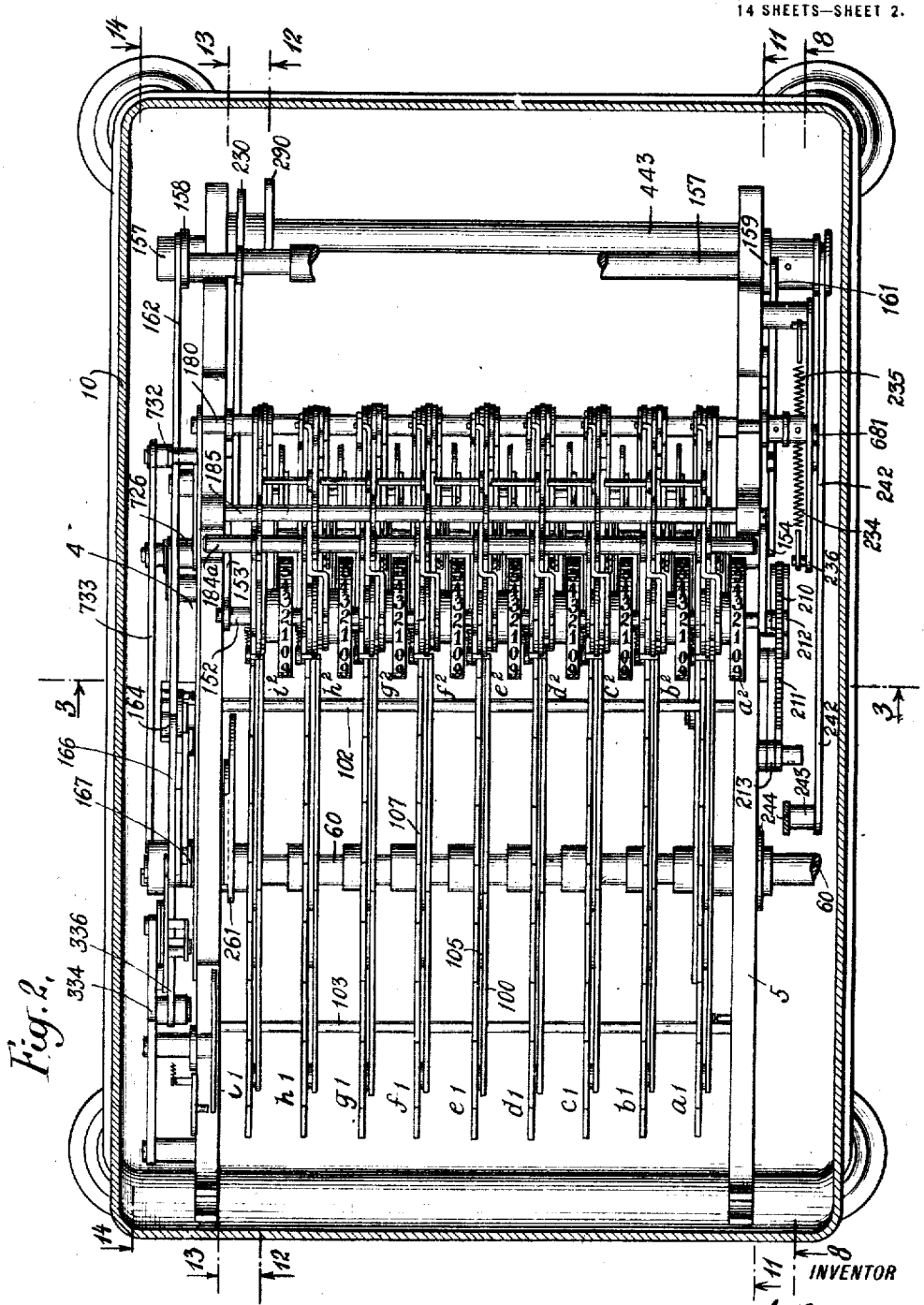

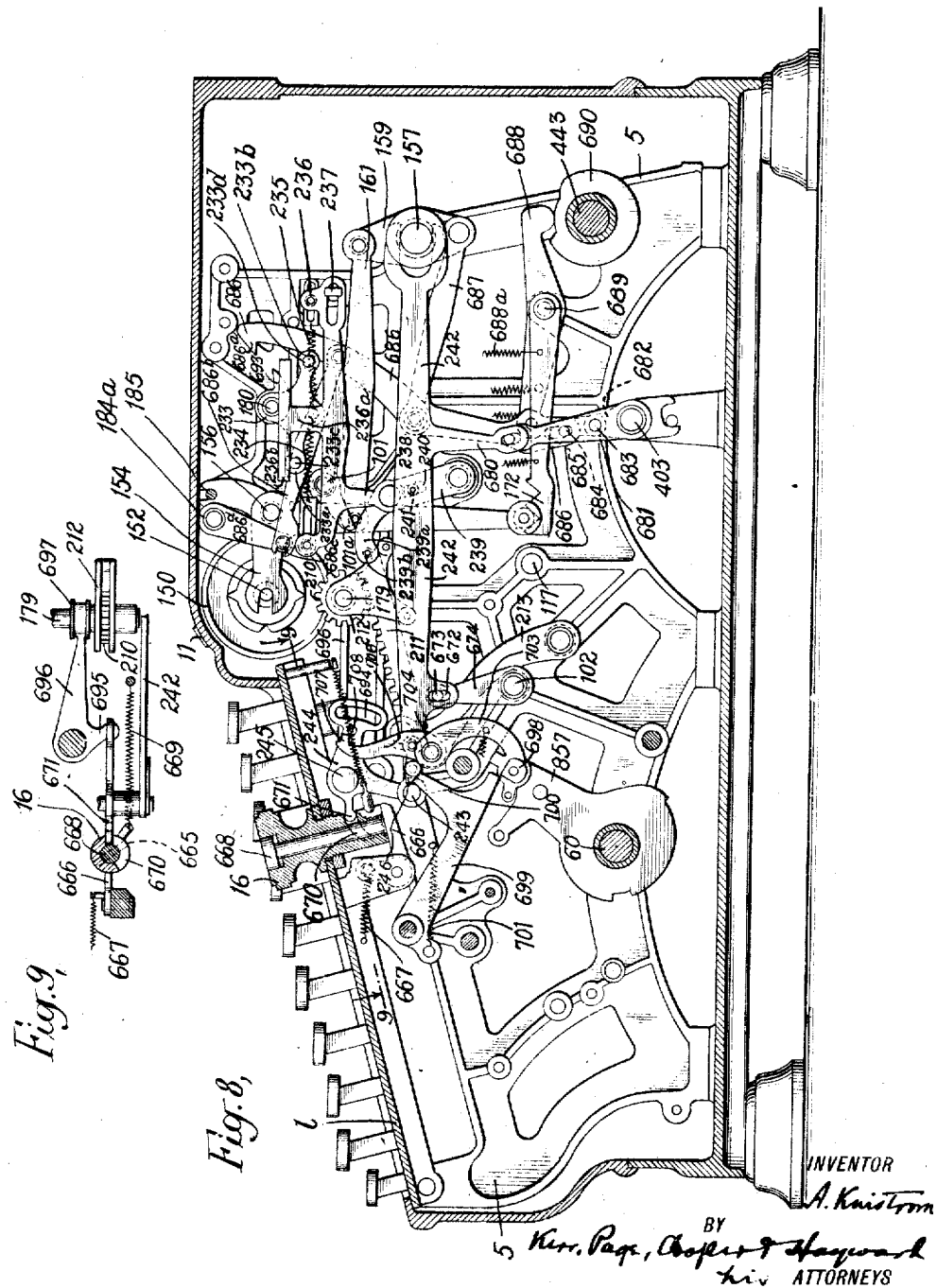

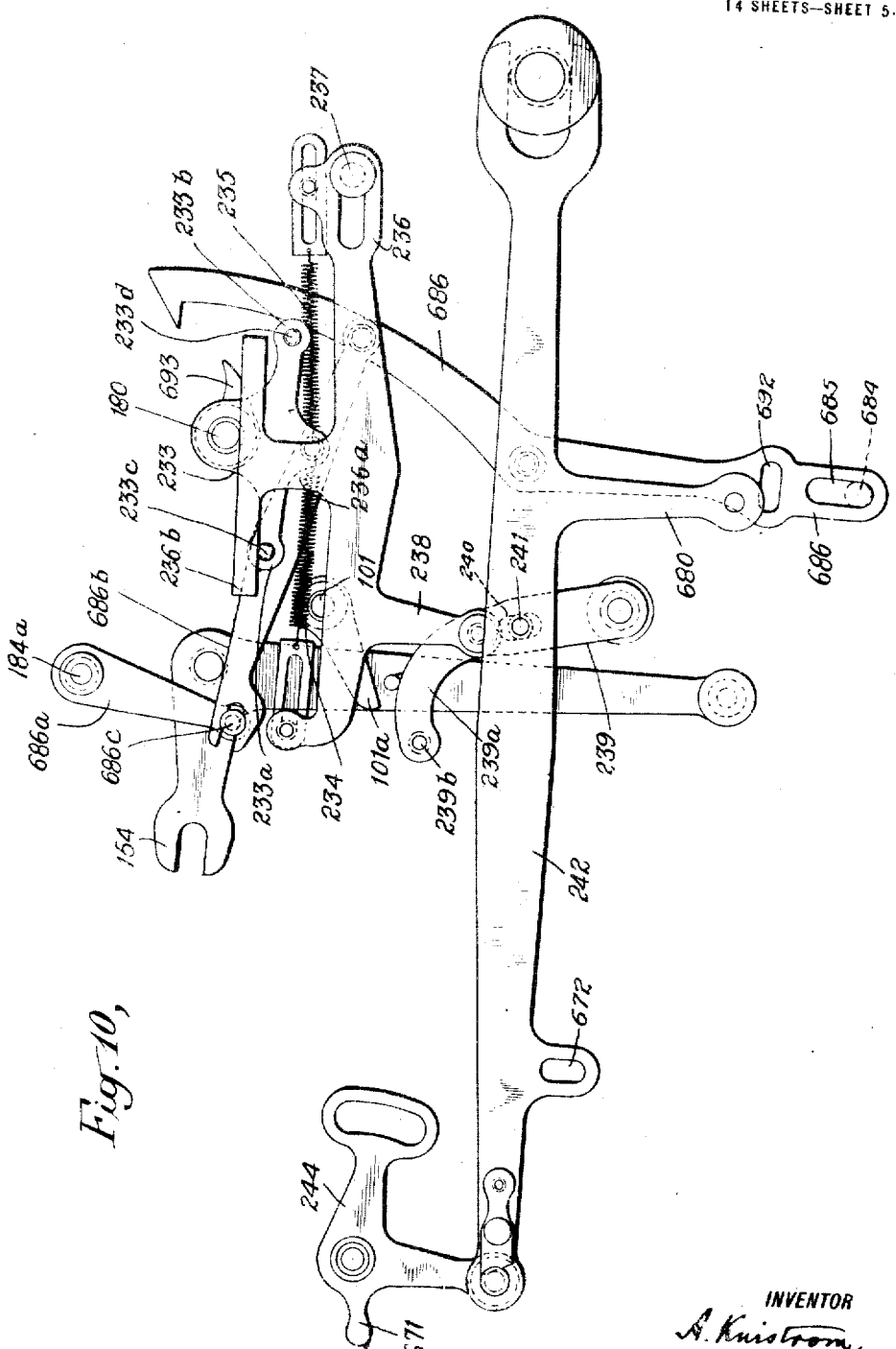

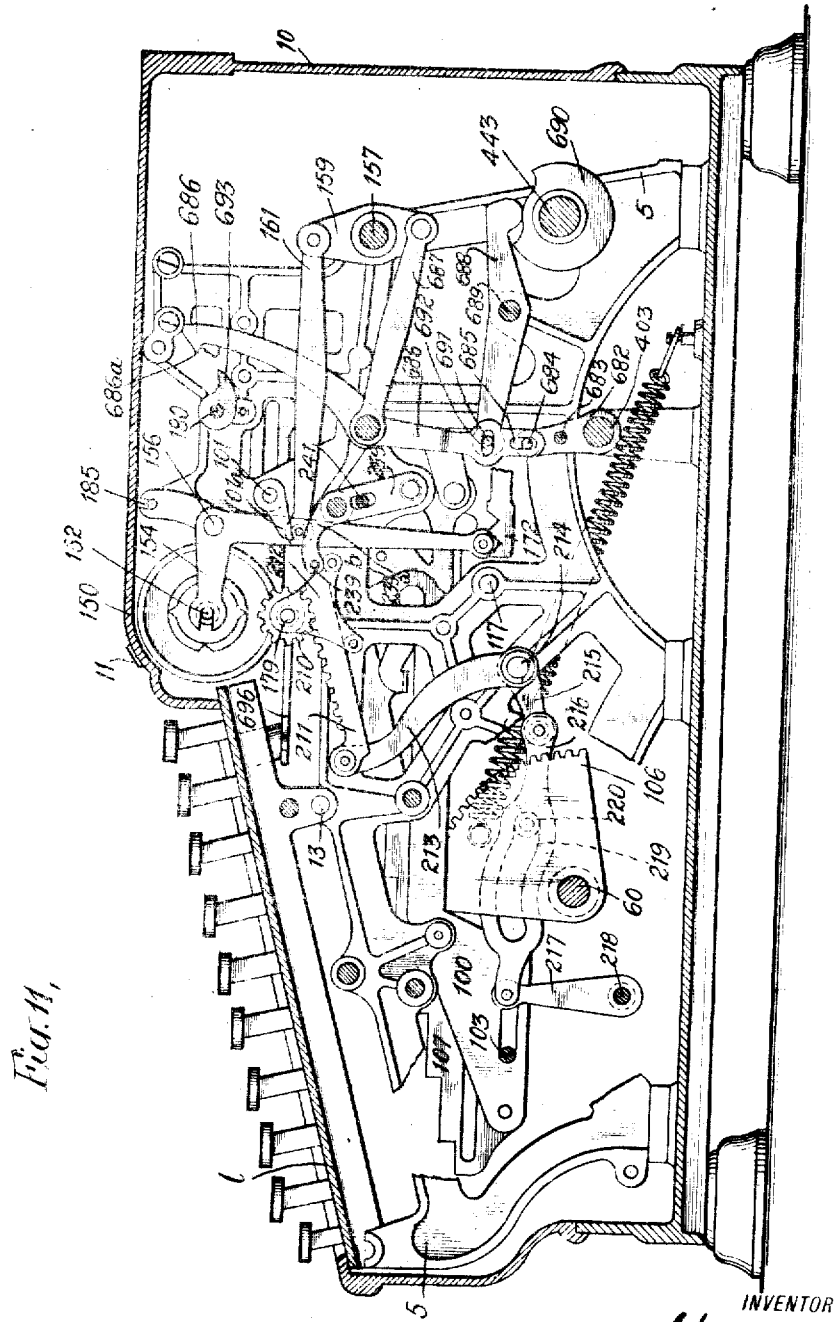

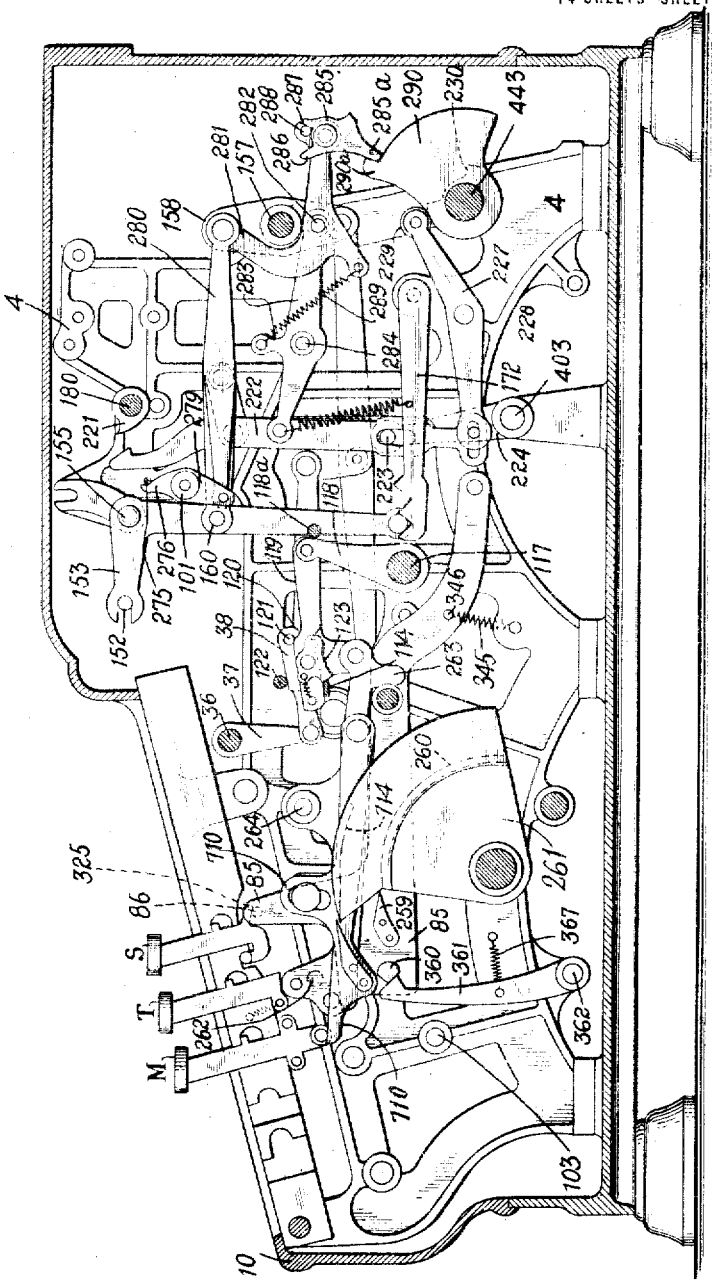

A. KNISTROM.
ACCUMULATING MECHANISM FOR CALCULATING MACHINES.
APPLICATION FILED JAN. 8, 1916.
1,285,234.
Patented Nov. 19, 1918.
14 SHEETS—SHEET 8.
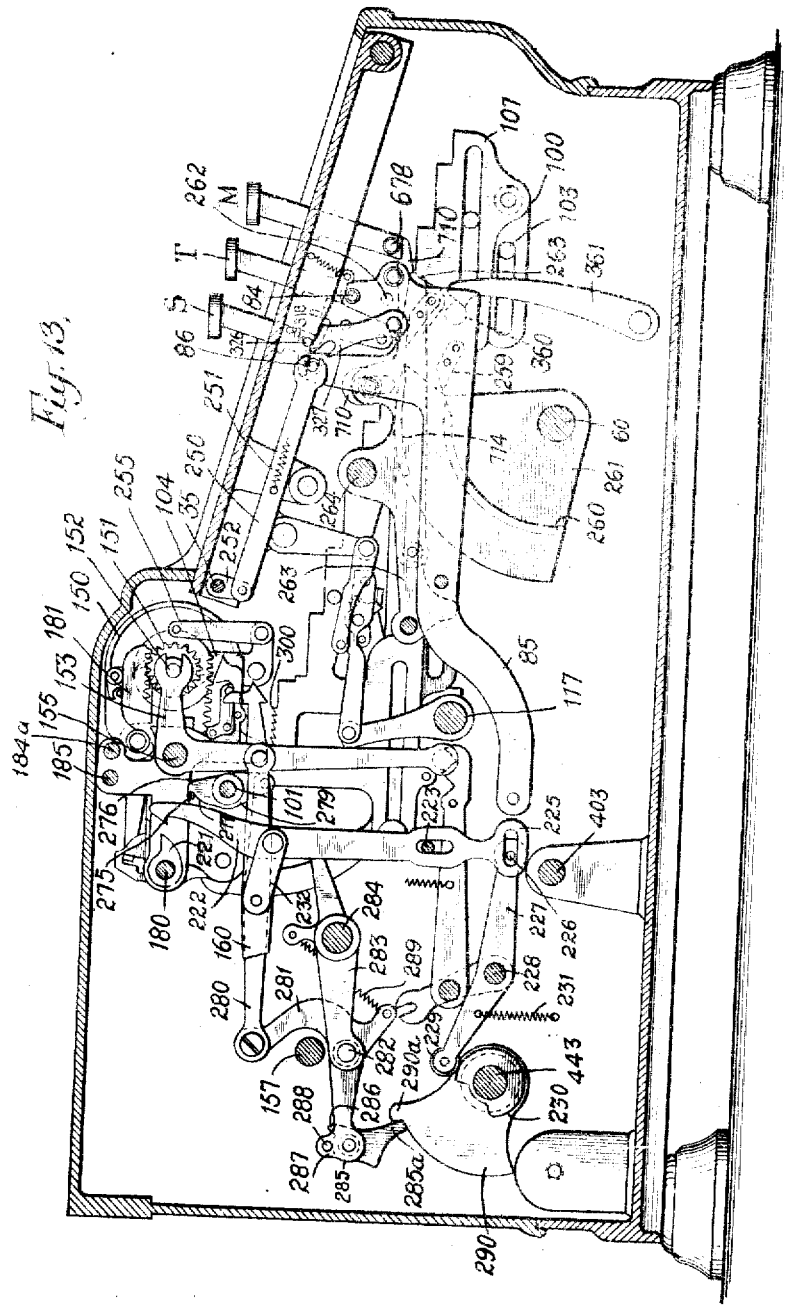
INVENTOR
A. Knistrom
BY
Kerr, Page, Cooper & Hayward
his ATTORNEYS

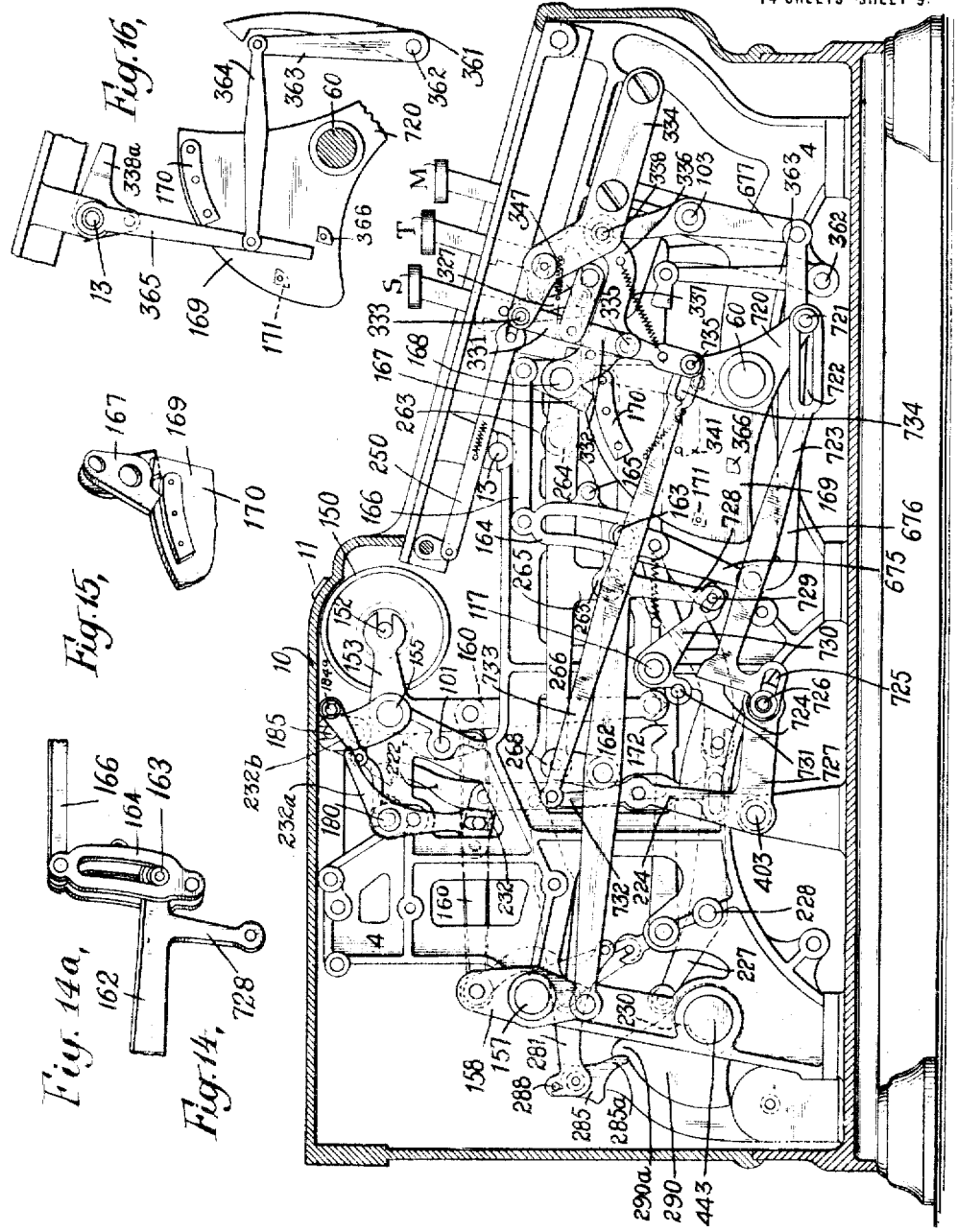
A. KNISTROM.
ACCUMULATING MECHANISM FOR CALCULATING MACHINES.
APPLICATION FILED JAN. 8, 1916.
1,285,234.
Patented Nov. 19, 1918.
14 SHEETS—SHEET 9.

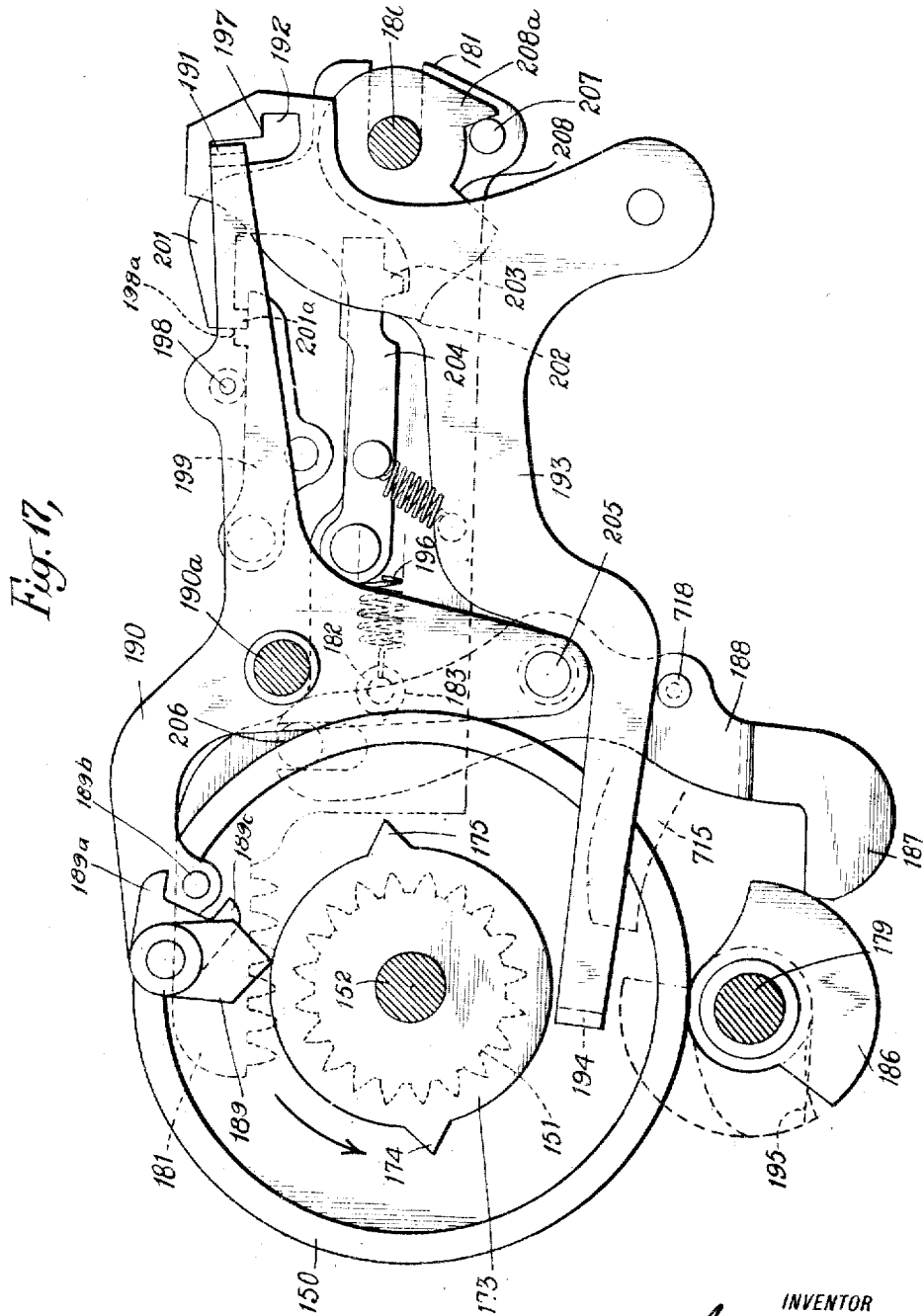

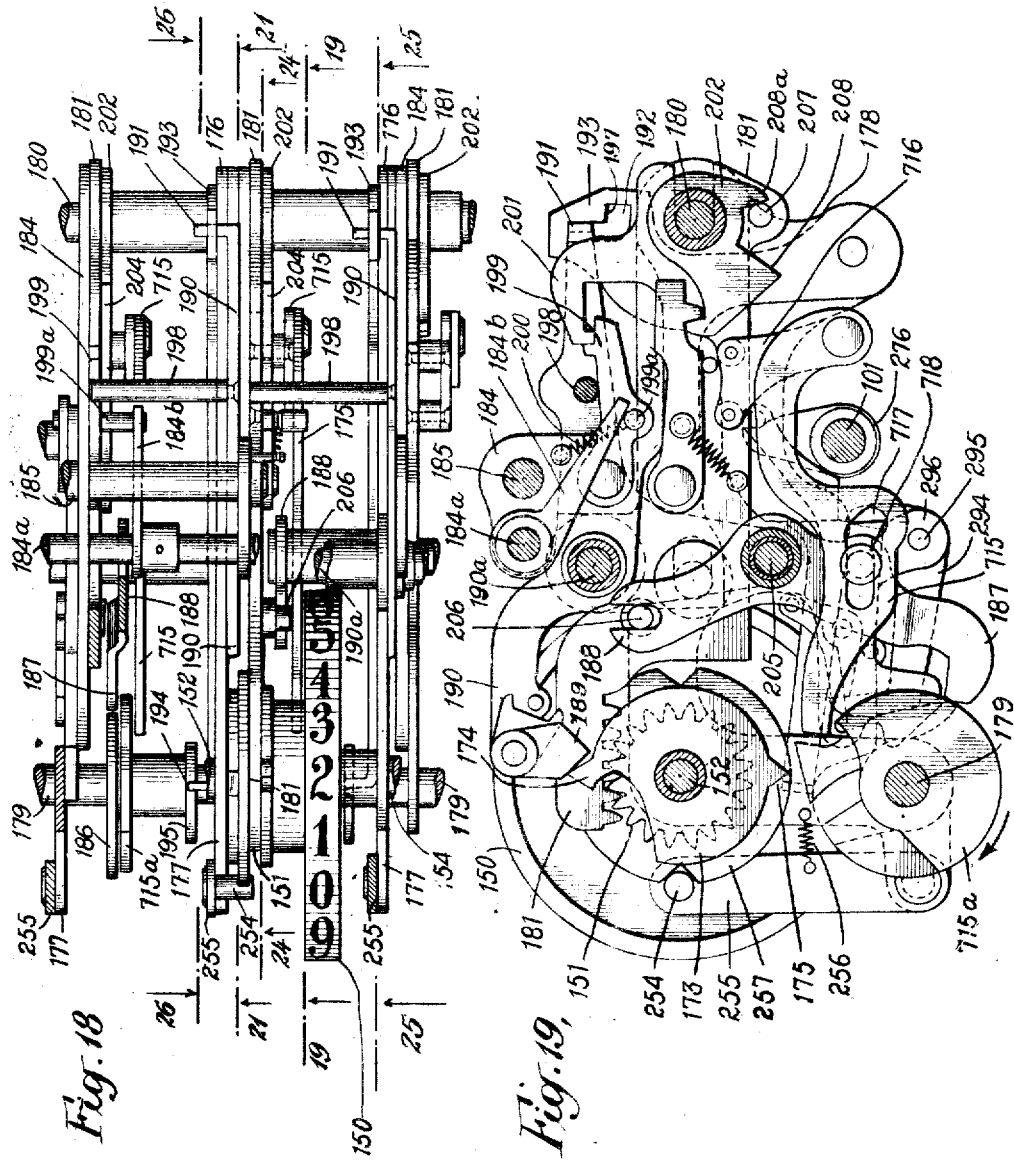

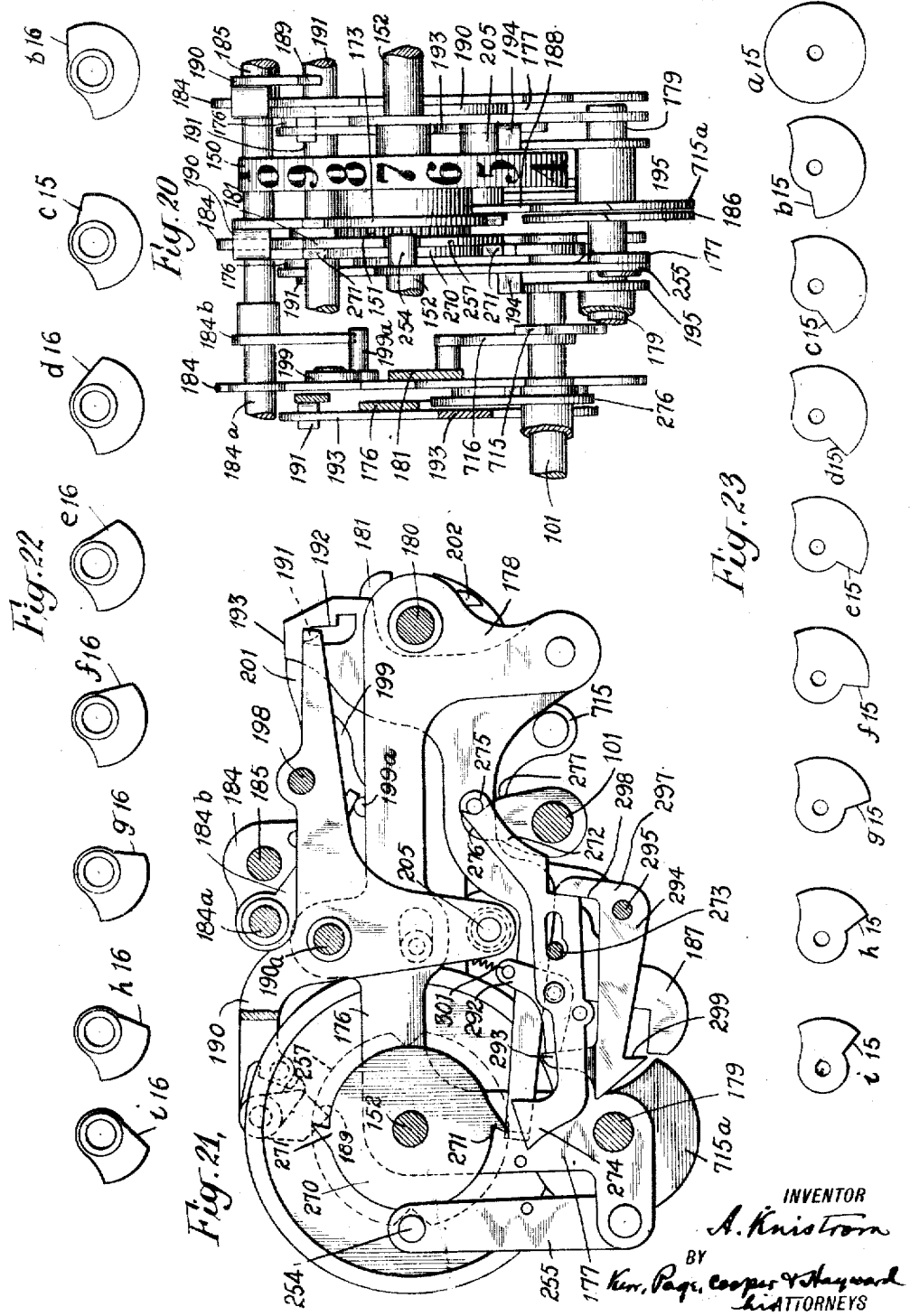

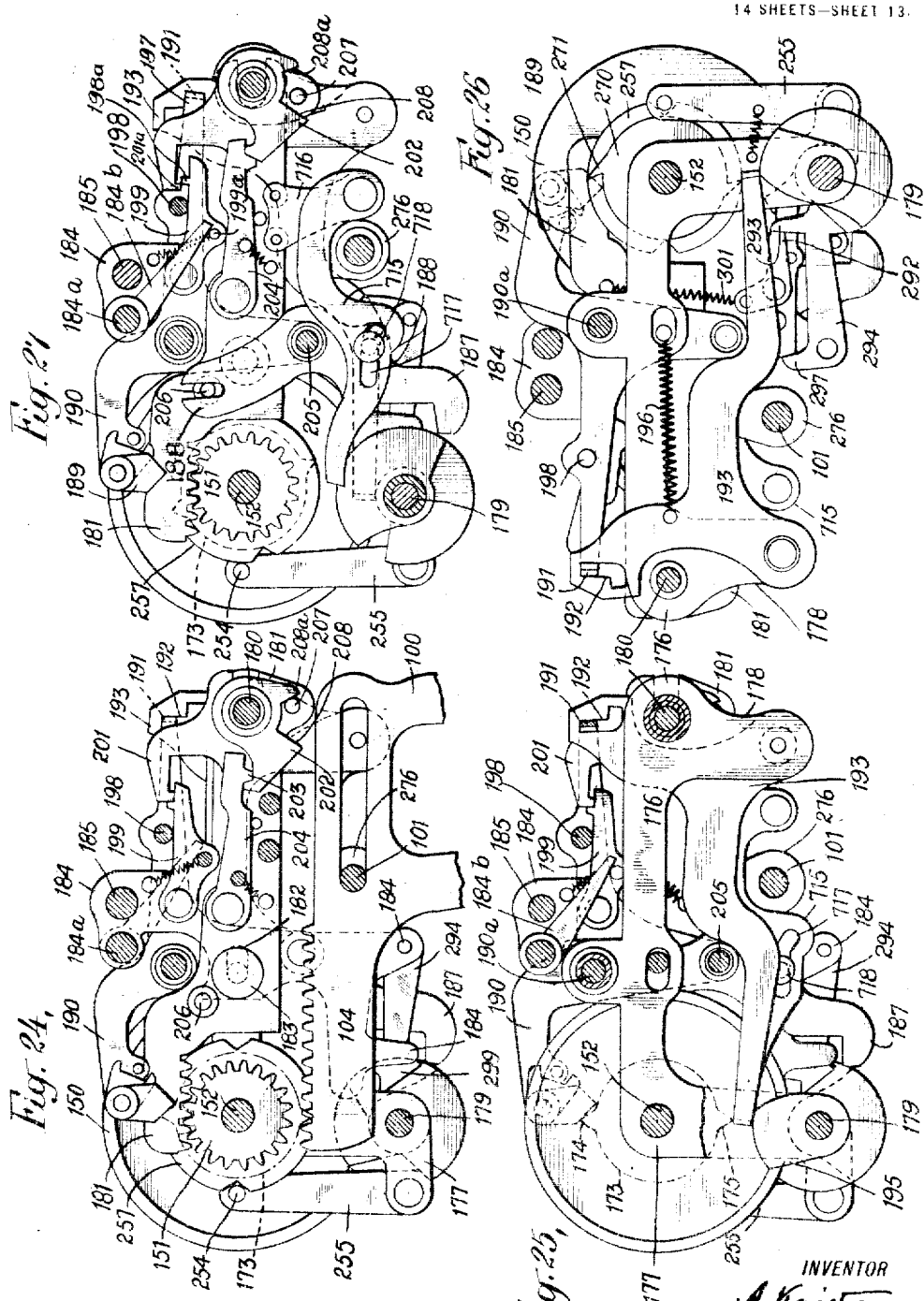

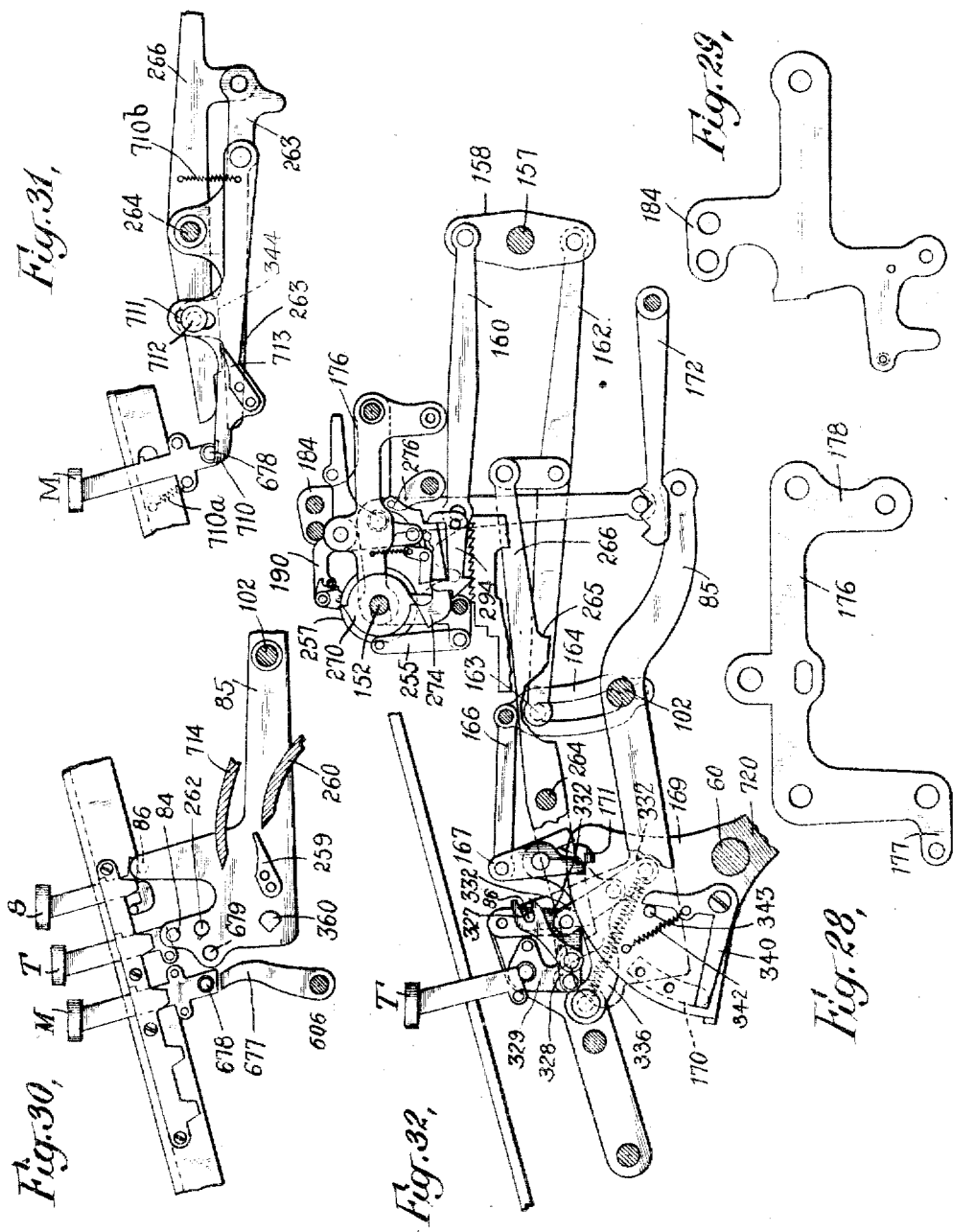

UNITED STATES PATENT OFFICE.

AUGUST KNISTROM, OF BINGHAMTON, NEW YORK, ASSIGNOR TO BUNDY MANUFACTURING COMPANY, OF ENDICOTT, NEW YORK, A CORPORATION OF NEW YORK.

ACCUMULATING MECHANISM FOR CALCULATING-MACHINES.

1,285,234.　　　Specification of Letters Patent.　　Patented Nov. 19, 1918.

Application filed January 8, 1916. Serial No. 70,908.

*To all whom it may concern:*

Be it known that I, AUGUST KNISTROM, a subject of the King of Sweden, residing at Binghamton, in the county of Broome and State of New York, have invented certain new and useful Improvements in Accumulating Mechanisms for Calculating-Machines, of which the following is a full, clear, and exact description.

The invention which forms the subject of the present application relates to computing or "accumulating" mechanisms for calculating machines, particularly machines for performing numerical addition. The chief object of the invention is to provide improved mechanism for the purpose indicated which shall operate with the necessary unfailing accuracy. A further object is to provide computing mechanism which will add numbers not only arithmetically but also algrebraically, that is, will perform the operation of arithmetical subtraction as well as addition, at the will of the operator. To these and other ends the invention consists in the novel features of construction and combinations of elements hereinafter described.

The preferred embodiment of the invention is illustrated in the accompanying drawings, in which—

Figure 1 is a longitudinal section, somewhat diagrammatic in character and showing only parts necessary or pertinent to an understanding of the present invention.

Fig. 2 is a plan view, with the casing 10 (which incloses the complete machine) in horizontal section.

Fig. 3 is a cross-section, substantially on line 3—3 of Fig. 2.

Fig. 4 is a detail view on a large scale, partly in cross section and partly in front elevation, showing portions of two adjoining and interconnected computing or accumulating mechanisms.

Figs. 5, 6 and 7 are detail side views of parts of the computing or accumulating mechanisms.

Fig. 8 is a longitudinal section on line 8—8 of Fig. 2.

Fig. 9 is a detal sectional plan view on line 9—9 of Fig. 8.

Fig. 10 is a detail side view, on a large scale, of certain parts shown on a smaller scale in Fig. 8.

Figs. 11, 12, 13 and 14 are longitudinal sections on lines 11—11, 12—12, 13—13, and 14—14 of Fig. 2.

Figs. 14ᵃ and 15 are detail perspective views of certain parts shown in side elevation in Fig. 14.

Fig. 16 is a detail side view of a locking mechanism (described in paragraph 39, hereinafter) provided to prevent injury to the machine in the operation of "clearing" or setting the machine back to zero.

Fig. 17 is a detail view, in side elevation and on a large scale, of certain parts of two adjoining and interconnected computing mechanisms.

Fig. 18 is a detail plan view, partly in horizontal section, of two adjoining and interconnected computing mechanisms.

Fig. 19 is a section about on line 19—19 of Fig. 18.

Fig. 20 is an end view, partly in cross section, of the mechanisms shown in Fig. 18.

Fig. 21 is a section about on line 21—21 of Fig. 18.

Fig. 22 is a side view of the subtraction cams, showing them "developed" in a plane, and Fig. 23 is a similar view of the addition cams.

Figs. 24, 25 and 26 are sections about on lines 24—24, 25—25 and 26—26 of Fig. 18.

Fig. 27 is a section on the same plane as Fig. 24 (that is, on line 24—24 of Fig. 18) but omitting certain parts and showing others, and also showing some parts in different operative positions from those in which they are shown in Fig. 24.

Figs. 28 and 29 are detail side views of the supporting frames employed in the computing mechanisms.

Figs. 30, 31 and 32 are fragmentary side views, looking toward the left of the machine from the inside, of certain parts associated with the subtraction key, and the total (or clearing) key, and actuated or set thereby.

1. *Key-controlled actuating devices.*—The numbers or items upon which the computing operations are to be performed are "put into the machine" by any convenient means, as for example by longitudinally reciprocatory elements 100, Fig. 1, of which there is one for each column or notational order. In the machine described in my prior application Ser. No. 759,261, filed April 5, 1913, each sliding member 100 has on one side a reciprocatory actuating member 105;

and alongside of the latter is a stepped controlling-member 107. On the member 100 is a pivoted three-armed dog 112, the upper arm of which is connected to the controlling member 107 by the pin and vertical slot construction shown at 113, so that the two members will move in unison but with the capability of limited movement of one relative to the other. On the horizontal arm of the dog 112 is a laterally bent finger 114 adapted to engage a shoulder 115 on the upper edge of the actuating member 105. The members 100, 105 and 107 being all in the home or extreme rightward position (as viewed in Fig. 1), with the shoulder 115 in rear, or to the right, of the finger 114, it will be clear that if the dog 112 be swung counterclockwise and the member 105 advanced, the controlling member 107 and the slider 100 will also be advanced; and that if the member 107 be arrested at any point in its path of advance the continued leftward or forward movement of the slider 100, through the agency of the dog 112, finger 114 and shoulder 115, will rock the dog clockwise and thereby disengage the said finger from the shoulder. The members 100 and 107 being tied together by means of the dog, the member 100 comes to rest but the actuating member 105 is free to continue its movement to the end of its path. The actuation of the dogs 112 to cause the fingers 114 thereof to engage the shoulders 115 is effected by a series of horizontally movable members 119 (Fig. 12) pivoted at their rear ends to a series of vertical arms 118 fixed on the transverse shaft 117. At the other end each member 119 carries a pawl 123 having an inclined toe adapted to engage and depress the adjacent finger 114 when the said member is advanced by the rocking of shaft 117, which is actuated at the appropriate time by any convenient means, not shown. On its upper edge each member 119 is formed with a shoulder 120, and above and adjacent to the shoulder is a pin 121 extending laterally from the rear end of member 38 substantially parallel to the aforesaid member 119. From the foregoing it is clear that if for any reason the slider 100 cannot advance, the inclined toe of the pawl 123, engaging the finger 114 when the member 119 is advanced, will cam the member 119 upwardly, causing it to swing on its pivotal connection with the arm 118 and thereafter to pass idly above the finger 114; such pivotal movement being permitted by the shoulder 120, which allows the member to pass the guide-stud 121. It is also clear that when no digit key is depressed in the row of keys associated with a particular slider the latter should not advance. To hold the slider under such circumstances, each row of keys has, between it and the rack-portion 104 (Fig. 1) of the associated slider, a stop-plate 30. The latter is carried by an arm 27, pivoted at 36 to the member which supports the keys and also pivotally connected to a depressible universal bar 26. The two ends of the latter are shown at the two ends of the key-board, but the intermediate portion, which underlies the studs 25 on the keys, is broken away. Hence when a key is depressed its lateral stud 25 depressed the universal bar and swings the stop-plate 30 down and out of the path of the rack 104, thus permitting the slider 100 to advance. Rigidly connected to the arm 27 which carries the stop-plate is a depending arm 37, to the lower end of which the aforesaid member 38 is pivoted. Upon referring again to Fig. 12 it will now be seen that whenever the aforesaid stop-plate is depressed to unlock the associated slider 100 the arm 37 is swung clockwise (as seen in Fig. 12), thereby carrying the guide stud 121 leftwardly away from the shoulder 120. The result is that when the member 119 is advanced, as described above, it cannot swing up past the stud but is held down thereby, and the pawl 123 is thus compelled to depress the finger 114 into the path of the shoulder 115 on the member 105, Fig. 1. The advanced sliders 100 are later retracted by the arms 118 which, in their homeward swing, strike the lateral studs 118ª on members 107 and thus move the latter and slides 100 back to home position. The actuating members 105 are advanced and retracted by a series of gear segments (one of which is shown at 106 in Fig. 1) on the main rockshaft 60, meshing with teeth on the lower edges of the said members.

2. The arrest of the members 107 to halt the sliders 100, as described in the preceding paragraph, is effected by a series of manually depressible digit keys (of which one is shown, depressed, at 126 in Fig. 1) overlying the member 107 and in the same or a parallel vertical plane, there being a key in each row for each of the nine digits 1, 2, 3, ... 9. The spacing of the digit keys and the steps on the controlling members 107 being properly proportioned, as is well understood by persons skilled in the art, it will be seen that when any key is depressed into the path of the step with which it is associated, the arrest of the sliding member 100 will occur at such point in its path that the extent of its advance is proportional to the numerical value of the digit represented by the depressed key. For example, if the 3-key is depressed, the slider will advance three times as far as when the 1-key digit is depressed. In this way the reciprocatory mechanisms $a1, b1, \ldots i1$, (Fig. 2), each composed of a slider 100, an actuating member 105 and a stepped controlling member 107, and each corresponding to a column or notational order of the items, serve to control the operation of the computing mechanisms, or apparatus now to be described.

3. *General description of accumulating mechanisms.*—The computing mechanisms, one for each notational order, are shown in plan in Fig. 3, and are designated by a2, b2, ... i2. As these mechanisms are alike, except in the minor particulars mentioned hereafter, a description of the structure and operation of one will suffice for all. Each mechanism includes a numeral wheel 150 (Fig. 4) rigidly connected to a co-axial counting or computing gear 151, the connected gears and wheels being mounted to rotate freely on a transverse shaft 152 and arranged with the gears directly above the respective racks 104 (Figs. 1 and 3) which are carried by the sliders 100. The shaft 152 is non-rotatably mounted in the forked ends of the horizontal arms of a pair of bell crank levers 153, 154 (see Figs. 8, 12, and 2) fulcrumed at 155, 156, the first named lever being mounted on the inside of the frame 4 and the other on the outside of frame 5.

4. The numeral wheels 150 bear on their peripheries two sets of digits, 0, 1, 2, ... 9, and arranged with these digits in proper angular relation to the twenty teeth on the associated counting gears 151. The normal position of the bell cranks 153, 154 (which, as described in Par. 3, support the shaft 152 on which the said gears and wheels are mounted) being as shown in Figs. 8 and 13, with the gears out of mesh with the racks 104, it is evident that the direction of rotation of the gears 151 (and the disks or wheels 150) when rotated by the moving racks 104 depends upon the times at which the supporting bell cranks are rocked to depress the shaft 152 and hence bring the gears into mesh with the said racks. If the gears are not depressed until after the racks have been advanced and are ready to start home, the rotation of the gears and numeral wheels will be counterclockwise (as seen in Fig. 1, for example) and hence the machine will add; the digits on the numeral wheels being so arranged that their numerical values increase in the opposite direction, as indicated in Figs. 3 and 4. On the other hand, if the gears are depressed into mesh with the racks before the latter are advanced the rotation will be clockwise, and, as explained hereinafter, the machine will subtract.

5. *Raising and lowering the counting or adding gears 151.*—The bell cranks 153, 154 are rocked, to lower and raise the shaft 152 and hence carry the counting or computing gears into and out of mesh with the actuating racks 104 for the purpose explained in Par. 4 by the following mechanism, the description being confined for the present to the adding function of the machine. At the back of the machine is a transverse shaft 157, Figs. 8, 12 and 13, journaled in the side frames 4, 5, and having fixed to it at or near its ends two levers 158, 159, connected at their upper ends by links 160, 161, to the depending arms of the bell cranks 153, 154, respectively, so that rocking the shaft in one direction will rock the bell cranks in the opposite direction, as will be readily understood. The shaft 157 is itself rocked by a reciprocatory link 162 pivoted at one end to the depending arm of the aforesaid lever 158 (Fig. 14) and having at its other end a stud 163 extending laterally into a curved slot in a vertical lever 164 fulcrumed at 165 on the side frame 4. With the stud in the bottom of the slot it is plain that when the lever 164 is rocked counterclockwise (as seen in Fig. 14) the shaft 157 is rocked in the same direction, thereby swinging the bell cranks 153, 154 in the opposite direction and bringing the computing gears 151 down into mesh with the actuating racks 104.

6. The lever 164 is rocked, for the purpose described in Par. 5, by the following mechanism: At the top of the lever is pivoted a link 166 which extends rearwardly (rightwardly as seen in Fig. 14) into pivotal connection with the upper end of a lever 167 fulcrumed at 168. This fulcrum is carried by a movable element 336 (pivoted at 338) which in the adding operation has no movement and may therefore be regarded, for the present, as fixed. The lever 167 is composed of two flat plates fixed together but spaced apart (see Fig. 15) to straddle the curved or outer edge of a sector plate 169 fixed on the main actuating shaft 60 just outside the frame 4. On the outer face of this section is a curved or arc-shaped locking member 170 which, contacting with the outer tail of lever 167, locks the same, and the parts connected with it, in the positions shown in Fig. 14, the bell cranks 153 and 154 being in their normal position with the computing gears 151 above and out of mesh with the racks 104, as in Fig. 13, for example. When the main shaft 60 and the sector 169 are rocked clockwise (as seen in Fig. 14, for example) through the medium of parts not shown, the locking rib or arc 170 is first carried from under the outer half of the lever 167, thereby unlocking the lever. In the meantime the sliders 100 and the racks 104 carried thereby are being advanced, as described in Par. 1; and while they are so moving the sector 169 continues its movement. Finally, as the actuating members 105 reach their outermost or advanced position the sector brings a stud 171, on its inner face, into engagement with the inner tail or lower end of lever 167 and rocks the lever counterclockwise (as seen in Fig. 14). This advances the link 166 and rocks the lever 164, with resulting depression of the counting gears 151 into mesh with the racks 104, as described in Par. 5. The retraction of the sliders 100 and racks 104 then rotates the said gears and the numeral dials 150 in the adding direction, as described in Par. 4. Whenever the bell-cranks 153, 154, are rocked for the purpose described, the studs on their lower ends, normally engaged by the notched ends of the spring raised detent arms 172, Figs. 8 and 14, pivoted on the side frames 4, 5, cam the detents down and land in the second notches therein, which serve to hold the bell cranks in the positions to which they have been brought.

7. While the counting gears 151 are being rotated by the racks 104, as explained in Par. 4, by the homeward movement of the racks 104, the sector 169 (Fig. 14) is of course returning to the initial position. This withdraws the lug 171 from coöperation with the lever 167 and, as the racks 104 arrive at home position and the gears 151 therefore cease to rotate, the end of the locking arc or rib 170 meets the tail of said lever and rocks the latter clockwise (as seen in Fig. 14), thereby rocking lever 164 in the same direction, retracting link 162, and, through the medium of shaft 157, arms 158, 159, and links 160, 161, rocking the bell cranks 153, 154 back to normal position. This raises the gears 151 out of mesh with the racks, 104, and snaps the studs on the lower ends of the said bell cranks back again into the first notches in the detents 172.

8. When in any given notational order the sum of two digits equals or exceeds ten, it is of course necessary to "carry" one to the next higher order. Thus for example, if in the units column the number five is already "in the machine" and seven is to be added thereto, the units wheel 150 and gear 151 must be rotated to two, and one must be carried over to the wheel 150 and gear 151 of the tens column. The carrying operation or "transfer" will now be described.

9. *Additive carrying, referring chiefly to Fig. 17.*—Consider Fig. 17, in which in order to simplify the explanation, only parts belonging to two consecutive orders (units and tens, for example) are illustrated. The disk 173 is assumed to belong to the lower of the two orders, and is fixed to the lower-order adding gear 151 which is not shown in Fig. 17. The said disk has two teeth 174, 175, corresponding to, though not in axial alinement with, the two zeros on the lower order numeral wheel 150 (not shown in Fig. 17), and in the adding operation of the machine is rotated in the direction of the arrow by the lower-order rack 104 (not shown) meshing with the aforesaid lower-order adding gear 151. The remaining parts shown in Fig. 17 belong to the next higher order, a fact which should be kept in mind throughout the subjoined description. The shaft 152 passes through a series of frame pieces 176, Figs. 18 and 25, (omitted from Fig. 14), having depending legs 177 and 178 in the former of which is mounted a rotatable cam shaft 179. At the rear the frames 176 are supported loosely on a transverse shaft 180 mounted rotatably in the side frames 4, 5. Hence the frames 176 partake of the up and down movements of the shaft 152, (Par. 5), and, in doing so, swing on the shaft 180 as an axis. The rack member 181, Fig. 17, (and all the other similar rack members) has its rear end forked, as shown, and embracing the shaft 180, while its forward portion is slotted, as at 182 (Fig. 24), to receive a pin 183 on one of a series of fixed frames 184 (Figs. 24 and 29) supported by the shaft 180 and also by a transverse rod 185 removably mounted at its ends in the side frames 4, 5. It will therefore be seen that the rack members 181 can slide horizontally a limited distance, but cannot move vertically. Hence depression of the shaft 152 (as explained in Par's 5 and 6) carries the gears 151 (Figs. 4 and 1, for example) out of mesh with the said rack members 181. With the exception of the rack member 181, and pawls 199, 204, the parts shown in Fig. 17 are mounted on or associated with the appropriate frame 176 and consequently swing up and down, in unison with the shaft 152, about the shaft 180 as an axis.

10. Referring again to Fig. 17, the tooth 175 on disk 173 (which, as stated in the preceding paragraph, rotates with the adding gear of the lower of the two orders under consideration) is at the "five position," and it is assumed that the number seven is to be added. The digit key for the number seven in the order to which disk 173 belongs is supposed to have been depressed, the slider 100 (Figs. 1 and 2) advanced, and the shaft 152 depressed, so that the parts illustrated in Fig. 17 are in the positions shown, with the gear 151 out of mesh with the carrying rack 181. In the meantime, the cam shaft 179 has been rotated (counter-clockwise as seen in Figs. 17 and 8) by the means hereafter described in Par. 14, so that cam 186 (Fig. 17), fixed thereon, has been turned to the position shown in dotted lines and is therefore out of engagement with the foot 187 on the lower end of the lever 188. The slider 100 and rack 104 now move home, and disk 173 (Fig. 17) is thereby rotated in the direction of the arrow. This carries the tooth 175 past the depending pointed dog 189 on the end of the three-armed lever 190 which is fulcrumed at 190a on the appropriate frame 176 (Fig. 21), first swinging said dog toward the left (as seen in Fig. 17) until it is stopped by its upper finger 189a striking the stud 189b on the lever 190. It will be understood that the dog and its fingers 189a, 189c, and the stud 189b, are so proportioned and arranged that the tooth 175 will not pass the dog, and hence completely rock the lever 190, until the disk 173 and its gear 151 (not shown in Fig. 17) have been turned one step beyond the "zero position." The rear end 191 of this lever is bent to engage a curved slot 192 in the upper arm of a detent 193 which is pivoted by its lower arm to the leg 178 of the frame 176 (Fig. 25) and has a horizontal arm terminating in a laterally bent finger 194 in the plane of a cam 195 fixed on shaft 179 alongside of the adding cam 186; said cam 195 being shown (in Fig. 17) in broken lines in the position occupied by it when the adding cam 186 is in its dotted line position. As tooth 175 passes the coöperating dog 189 of lever 190, the latter is rocked clockwise (as seen in Fig. 17), thereby depressing the rear end 191 in slot 192 and permitting the detent 193 to be swung by the spring 196 (Fig. 26) connected to the detent and to lever 190, bringing the finger 194 of said detent into the path of cam 195. This movement of the detent brings the flat or horizontal portion 197 of slot 192 over the bent end 191 of lever 190 and so holds the lever with its said bent end depressed and its other end raised.

11. The lever 190 has fixed to it a pin 198 overhanging a locking pawl 199 pivoted on the frame 184 (Fig. 19) and normally held, by a coil-spring 200 connected to the stud 199a (Fig. 17), with its vertical tooth 198a in the path of a depending tooth 201a of the finger 201 on rack member 181, which rack member, it will be remembered, belongs to the higher of the two numerical orders under consideration. The described actuation of lever 190 (Par. 10), by the tooth 175 therefore depresses the locking pawl 199 out of the path of finger 201 and leaves the rack member 181 free to advance at the proper time; the finger 202, fixed on shaft 180, having been swung down, out of the path of the tooth 203 on the spring-depressed pawl 204 (pivoted on the rack member 181) by the actuation of shaft 180 as described in Par. 15 hereafter. Lever 188 (Fig. 17) is fulcrumed at 205 on the lower arm of lever 190, and by its forked upper end engages a stud 206 on the side of the carrying or transfer rack 181. The rocking of lever 190 clockwise by the tooth 175 therefore performs still another function, namely, it rocks lever 188 clockwise on stud 206 as a fulcrum (the rack 181 being held against rightward movement by shaft 180) thereby throwing the foot 187 into the path of the cam 186, which, it will be remembered, has previously been turned to the dotted line position. The shaft 152 is now raised (as described in Par. 7) bringing gear 151 into mesh with the rack member 181, after which the cam 186 is turned (clockwise) back to the full-line position. During this movement the cam engages the foot 187 and rocks the lever 188. Since fulcrum 205 cannot move, by reason of the lever 190 being held by the slot 192, as previously described at the end of Par. 10, the lever 188 must rock on the fulcrum 205. This throws the forked upper end of lever 188 forward (toward the left, as seen in Fig. 17) thus advancing the rack 181 one tooth, and rotating the gear 151 a like distance in the adding direction, indicated by the arrow; at the same time bringing tooth 201a, on finger 201, to the left of tooth 198a on the locking pawl 199, as in Fig. 27. The "carrying" or "transfer" from the lower to the higher order is then complete. Just after the cam 186, rotating clockwise from the dotted line position, actuates lever 188 to advance the rack member 181, as described, the cam 195 meets and lifts the end 194 of detent 193. In the meantime, the finger 202 has been raised by shaft 180, on which it is fixed, bringing it behind or to the right of the tooth 203 on pawl 204 (as in Fig. 27), with the result that the rack 181 is held positively in its advanced position. Hence raising the detent 193 by cam 195, thereby withdrawing shoulder 197 from the finger 191, permits the spring 196 (Fig. 26) to swing the lever 190 counterclockwise on its pivot 190a to the normal or initial position shown in Fig. 17, and allows the pawl 199 to be drawn up by its spring 200, Fig. 19, thereby bringing the tooth 198a into the path of tooth 201a to the right of the latter and locking the carrying rack 181 in its leftward or advanced position. The return of lever 190 to initial position rocks lever 188 counterclockwise (as seen in Fig. 17) on stud 206, thereby withdrawing the foot 187 of said lever 188 from contact with the cam 186. At this stage the machine comes to rest, with the rack 181 advanced and still in mesh with the gear 151, and with the stud 207 on the rear end of rack 181 adjacent to the edge 208 of the notch in the finger 202, as in Fig. 27.

12. *Condition of accumulating mechanism after completion of carrying.*—At the next actuation of the machine, whether adding, totaling or merely idle, the shaft 152 is first depressed at the appropriate time, as described in Par's 5 and 6, thereby disengaging gear 151, Fig. 27, from the rack 181.

To depress shaft 152, as explained in Par's 5 and 6 just referred to, the links 160 and 232 are shifted toward the left, Fig. 14, thereby rocking lever 232a which is connected to the last-named link and fulcrumed loosely on the end of shaft 180. The upper end of this lever rocks an arm 232b which is fixed to the end of shaft 184a and which therefore rocks said shaft counterclockwise as seen in Fig. 14 and clockwise as seen in Fig. 19. This shaft has a series of fingers 184b to coöperate with the studs 199a on the locking pawls 199 (Fig. 19); so that as the shaft is rocked in the operation of depressing shaft 152 to carry the adding gears 151 out of mesh with the carrying or transfer racks 181 the pawls 199 are depressed out of engagement with the fingers 201, thereby leaving the racks free to move back into home position. Then shaft 180 is rocked, counterclockwise as seen in Fig. 17, by the mechanism described in Par. 14. This first swings finger 202 down from the position shown in Fig. 27, and out of the path of tooth 203 on the pawl or dog 204; then brings edge 208, of the notch in said finger, against stud 207 on the rack member 181, and retracts the rack member and its finger 201. Link 160 is now actuated (as described in Par. 6) to raise the gears again into mesh with the racks 181; and since link 160 is connected with shaft 184a as explained above, the actuation of the link rocks the shaft counterclockwise, as seen in Fig. 19, thereby permitting the pawls 199 to swing up into locking position as in Fig. 17. At the same time, the retraction of the rack member 181 swings lever 188 clockwise (as seen in Fig. 17) on its fulcrum 205, thereby restoring the foot 187 to initial position but not into contact with the cam 186, since the latter has already been rotated to the dotted-line position. Then if no item had been set up on the keyboard, or if the item set up does not necessitate another "carrying" operation, the cam 186 returns idly to the initial position, shown in full lines in Fig. 17.

13. *Additive carrying helix, and actuation of same.*—It is evident that a transfer or carrying mechanism must be provided between each notational order, and the next higher order, and in the present machine there are eight such interconnected computing mechanisms, as indicated in Fig. 2, for example. It is also evident that the several transfer mechanisms cannot be operated simultaneously, but must be operated in succession from the lowest order to the highest. This successive operation of the carrying mechanisms is secured by arranging the operative edges of the adding cams b15, c15, ... i15, on the shaft 179 in the form of a helix, as indicated diagrammatically in Fig. 23, in which the cams are "developed" in a plane. Inasmuch as there is no transfer or carrying to the lowest order, no adding cam and carrying rack need be provided for such order. A simple disk a15 (Fig. 23) is provided for said order, however, merely as a spacing member on the shaft 179.

Since there is no carrying or transfer from the highest order, the lever 190 and disk 173 which would otherwise be provided therefor are omitted.

14. The cam shaft 179, the purpose and function of which is described in Par's 9, 10 and 11, is rotated at the appropriate instants, first in one direction and then in the other, by the following devices: On the right hand end of said shaft 179 and fixed thereto is a pinion 210, Figs. 2, 8, 9 and 11, in mesh with a rack 211 which is supported by a swinging frame 212 on said shaft. The rear end of the rack is pivoted to the upper end of an arm 213 fixed to the outer end of a stud 214, Fig. 11, rotatably mounted in the side frame 5 and having fixed to it at its other end an arm 215 arranged at an angle to the first named arm; the two arms thus constituting a bell-crank lever. The arm 215 is pivoted to one end of a cam-link 216, the inner end of which is pivoted to an arm 217 which is itself pivoted at 218 on the side frame 5. The link 216 is formed with a longitudinal cam slot 219, engaged by a stud 220 on the adjacent side of the gear segment 106, which is fixed to and hence rocked by the main shaft 60. When the said gear segment is swung counterclockwise (as seen in Fig. 11) the stud 220 raises the link 216 until the stud escapes into the portion of the cam slot 219 that is concentric with the shaft 60. This lifting movement is quick and short, but owing to the fact that the arm 213 is several times longer than arm 215, the movement of link 216 is sufficient to advance the rack 211 a distance about equal to its whole length, thereby rotating the cam shaft 179 counterclockwise. On the return or clockwise movement of the stud 220, it at first moves idly through the concentric portion of the cam slot 219, but toward the end of its movement it enters the eccentric portion and quickly depresses the arm 215. This rocks the long arm 213 counterclockwise and rapidly retracts the rack 211 to initial position, which movement of the rack rotates the pinion 210 and cam shaft 179 clockwise. The purpose of employing a pivoted rack to actuate the pinion 210 is to permit the vertical movement of the pinion (and the cam shaft 179 which carries the same) in company with the shaft 152 as described in Par. 9, without causing appreciable rotary movement of the pinion and shaft and without disconnecting the pinion from the rack. When the shaft 152 and frames 176 are depressed or raised the rack 211 simply swings slightly on its pivotal connection with the arm 213.

15. The shaft 180, which, as described in Par's 9, 10 and 11, is rocked at the proper times in the adding operation, is actuated by the following mechanism: On the left end of the shaft 180, Figs. 12, 13, and 14, is a finger 221 which can be engaged and drawn down by a hooked vertical link 222. The latter is pivotally and slidably mounted at its lower end on a pin 223 fast on the upper end of an arm 224 fixed on the adjacent end of the transverse shaft 403. At the bottom of the hooked link 222 is a horizontal slot 225 engaged by a stud 226 (Fig. 13) on one end of a lever 227 fulcrumed loosely on the end of a short transverse shaft 228 mounted in the side frame 4. The other or rear end of the lever 227 carries an anti-friction roller 229 which is caused to bear on a cam 230 by a coil spring 231. The cam 230 is fixed on the transverse shaft 443, which is rocked by any convenient means, as for example, that described in Par. LXXXVI in my prior application Ser. No. 759,261 referred to above. The first movement of shaft 443 is clockwise, as seen in Fig. 13, and early in this movement the drop in the cam 230 comes under the roller 229, whereupon the spring 231 rocks lever 227 counter-clockwise, raising the member 222 so that its hooked upper end is above the plane of the adjacent end of finger 221. The link 222 is also connected by a link 232 to the horizontal link 160, which, as described in Par. 5, is one of the parts that coöperate to depress the shaft 152 by rocking the bell crank levers 153, 154. Hence the advance of link 160 to depress said shaft 152 swings the raised hook-member 222 over to a position above the end of finger 221. Thereafter, the movement of cam 230 is reversed, bringing its rise again under the roller 229. This rocks the lever 227 clockwise, as seen in Fig. 13, drawing down the member or link 222 and hence rocking the finger 221 and the shaft 180 on which the same is fixed. When the link 160 is retracted to reverse the movement of the bell cranks 153, 154, for the purpose of raising the shaft 152 as described in Par. 6, the link or hook-member 222 is swung clockwise (as seen in Fig. 13) thereby withdrawing its hooked upper end from engagement with finger 221. Whereupon the shaft 180 is instantly rocked back (counter-clockwise as seen in Fig. 13) to initial position by a short depending arm 233, Figs. 8 and 10, fixed on the right-hand end of the said shaft and connected to a pair of alined but opposed springs 234, 235, which at their extremities are connected to a horizontally adjustable member 236. One end of the latter is slotted to receive a supporting pin 237 fixed on the side frame 5 and the other end has a depending arm 238 pivoted to a vertical arm 239 which is itself pivoted at its lower end on the frame 5 and has a longitudinal slot 240 engaged by a pin 241, on a long horizontal member 242. As seen in Fig. 8, the member 242 at its right-hand end is slidably mounted on the shaft 157 and at its other end is pivoted to a stud 243 on the depending arm of a bell-crank lever 244 fulcrumed at 245. When the parts are in the position shown in Fig. 8 (the machine being then used for adding) the member 242, arm 239 and arm 238 are in their advanced positions and the spring 234 is tensioned, thereby impelling arm 233 and shaft 180 clockwise as seen in Figs. 8 and 10, and counter-clockwise as seen in Fig. 13. The end of the member or link 242 which engages the stud 243 on the lever 244 is simply slipped over the stud, and is held in place by a pivoted spring clip 246 the tip of which enters a groove (not shown) in the stud.

16. To provide stops to limit the movement of shaft 180 (actuated as described in Par. 15) in both directions, the member 236, Figs. 8 and 10, is formed with a central vertical neck 236a at the top of which is a horizontal bar 236b, and the arm 233 is provided with oppositely extending fingers 233a, 233b, having studs 233c, 233d, to coöperate with the extremities of the bar 236b as stops. When the member 236 is in the position shown in Figs. 8 and 10, and hence with the spring 234 tensioned, the stud 233c bears against the left end of bar 236b. When the link 242 is shifted to the right (by the means described in Par. 19) to tension spring 235, the bar 236b is moved off of stud 233c and over stud 233d.

17. *Function of key-board in subtracting operation.*—As explained in Par. 4, the accumulating or computing gears 151 (Fig. 13 for example) and wheels 150 are rotated clockwise, as seen in Fig. 13, in the adding operation by depression of the gears into mesh with the racks 104 (Fig. 1) after the racks have been advanced and have been arrested by the digit key as described in Par. 2, so that the gears will be rotated by the racks in their homeward or retracting movement. In the adding operation of the computing mechanisms, described in Par's 9 to 12 inclusive, the carrying or transfer is from the lower to the next higher order. Inasmuch as subtraction is the inverse of addition it is apparent that in operating the machine to subtract instead of add an item, the gears 151 must be rotated counter-clockwise (as seen in Fig. 13, for example) and hence must be depressed into mesh with the racks 104 before the sliders 100 are advanced. It is also clear that in subtraction the carrying or "borrowing" is from the higher to the next lower order of notation. Keeping these principles in mind will make it easier to understand the subtracting operation of the machine.

18. The item to be subtracted, that is, the "subtrahend", having been set up on the keyboard in the usual manner, precisely as for addition, the next operation is to turn manually the subtraction button or knob 16 clockwise, as seen when looking down upon it in Fig. 8. Referring to Figs. 8 and 9, it will be seen that the button 16 is tubular and has in its bottom a transverse slot 665, normally out of register with the vertically movable finger 666, pivoted to a lug depending from the keyboard frame section 1, which is at the extreme right of the keyboard. This finger is held against the bottom of the button 16 by a coil spring 667, so that when the button is turned as far as it will go in the aforesaid clockwise direction and the slot 665 is thereby brought into register with the finger the latter will be snapped up into the slot and lock the button in its turned position. To return the button to initial position it is only necessary to press down the finger key 668 which is slidably mounted in the button 16. This swings the locking finger 666 out of the slot and permits the spring 669 to turn the button back.

19. The portion of the button 16 which is below the top of the keyboard frame section 1 has in its side a helical cam-slot 670, Figs. 8 and 9 (shown in dotted lines in Fig. 8), into which extends a finger 671 on the bell-crank lever 244, described in Par. 15. Hence when the button 16 is turned as described in Par. 18, the cam-groove 670, Fig. 9, swings the lever 244 counterclockwise as seen in Fig. 8 and advances the link 242 rightwardly. This actuates the arm 239 (Fig. 10) and tensions the spring 235, as will be clear from the latter part of Par. 15. The shaft 180 is therefore rocked counterclockwise as seen in Fig. 8, swinging the fingers 202 (Fig. 24) down and out of engagement with the teeth 203 on the carrying rack dogs 204. The arm 229 (Figs. 8 and 10) has a curved extension 239a, normally in the position shown in the figures just mentioned, but when the arm is rocked by the member 242, as described in Par. 15, the stud 239b on the said extension is carried under the inclined finger 101a fixed on the extreme right end of the transverse shaft 101. The latter is thus prevented from turning counterclockwise.

20. The link or bar 242, Fig. 8, is also connected, by a slot 672, to a lateral stud 673 on the upper end of an arm 674 fixed to the right end of the transverse shaft 102. The described rightward advance of the link 242 by the bell-crank lever 244 (Par. 19) therefore rocks the arm 674 and shaft 102 clockwise as seen in Fig. 8, thereby rocking arm 675 (Fig. 14) counterclockwise as seen in Fig. 14, the arm 675 being fixed to the left end of the shaft outside the frame 4. This movement of the last mentioned arm moves the link 676 toward the operator (toward the right of Fig. 14) and hence swings counterclockwise the lever 677 fulcrumed loosely on the shaft 103 to the lower end of which lever the link is pivoted. The upper end of the lever 677 is shown in Fig. 30 to be normally under the stud 678 on the lower end of the vertically movable subtraction key M arranged at the extreme left of the keyboard. Rocking the said lever 677 as described therefore swings its upper end out of the path of the stud 678 (thereby unlocking the key M and permitting the same to be depressed) and into the path of a stud 679 on the swinging frame 85 fulcrumed on the shaft 102. The frame now cannot be swung counterclockwise (as seen in Fig. 30), about its axis or fulcrum 102.

21. The bar or link 242 (Fig. 8), which, as described in Par. 19, is moved away from the operator by turning the button 16, has a depending finger 680 provided at its lower end with a stud extending laterally into a slot in the upper end of a vertical arm 681 fixed to the end of the transverse shaft 403. Just outside the frame 5 the shaft 403 has fixed to it an upright arm 682 (Fig. 11), rigidly connected to the said arm 681 by an alining pin 683 and provided at its upper end with a stud 684 extending laterally into a vertical slot 685 in the lower end of a hooked member 686. The stud 684 thus permits the member or lever 686 to swing on the stud as a pivot, and the slot 685 permits the said member to be reciprocated vertically. Swinging movement of the member mentioned is produced by a link 687 connecting the member to the lower portion of the lever 159 fixed on the shaft 157, which is rocked by the means described in Par. 5. Vertical reciprocation of the hooked member 686 is produced by a lever 688 fulcrumed at 689 on the side frame 5. A spring 688a (Fig. 9) causes one end of the lever to bear on a cam 690 fixed on the shaft 443, which is rocked by the means described in Par. LXXXVI of my prior application Ser. No. 759,261 mentioned hereinbefore. On the other end of the lever 688 is a stud 691 (Fig. 11) extending laterally into a horizontal slot 692 in the hook member 686, just above the vertical slot 685, so that as the lever 688 is rocked the hooked member will be lowered by the cam 690 and raised by the spring 688a. The member 686 is also capable of pivotal movement on its connection with the link 687. Hence when the shaft 403 and arm 682 are rocked clockwise (as seen in Fig. 11) by turning the subtracting knob 16, through the medium of the aforesaid link 242 (Fig. 8), the member 686 is swung counter-clockwise, thereby bringing the hook 686a, at the top of the member 686, over toward the finger 693 (Fig. 11) fixed on the right end of shaft 180. Now when the shaft 157 is rocked (clockwise as seen in Fig. 11), the link 687 swings hook 686 to a position above the finger. Rocking the shaft 403 by arm 681 (Fig. 8) not only positions the hooked member 686, as described, but also swings arm 224 clockwise as seen in Fig. 12, thereby swinging the hooked member 222 out of position to engage the finger 221, with which it coöperates in the adding operation of the computing mechanisms, as explained in Par. 15. At the top of the arm 224 is an extension 732 (Fig. 14) connected by a slotted link 733 to the lower end of the toggle link 332, to which the normally stationary member 336 is pivotally connected. Hence when the arm 224 is rocked (clockwise, as seen in Fig. 12, but counterclockwise as seen in Fig. 14) it buckles the toggle 331—332, raising the lever 167 (carried by said member 336) out of the path of the stud 171 and against the stop finger 338a, Fig. 16, thereby locking the lever. The stop finger just mentioned is rigidly fixed on the adjacent end of the transverse rod 13.

22. The member 686 has pivoted to it a link 686b (Figs. 8 and 10) extending leftwardly and provided with a forked end engaging a stud 686c on the lower end of an arm 686d fixed on and depending from the right end of a shaft 184a mounted rotatively in the frames 184, Fig. 29. (See also Figs. 21 and 24). When the hooked member 686 is swung by turning the subtraction button 16, as described in the preceding paragraph, the link 686b is moved toward the left (as seen in Fig. 8) thereby bringing the bottom of the notch at its end against the stud 686c. Hence when the member 686 is swung farther, by the arm 159 and link 687, the arm 686a and shaft 184a (Fig. 10) are rocked clockwise. The shaft just named has fixed on it a series of fingers 184b (Fig. 19) normally resting idly on the studs 199a fixed to the locking pawls 199, so that when said shaft is rocked as described, the pawls 199 are swung down out of engagement with the fingers 201, thereby unlocking the carrying racks 181, and holding the pawls in depressed position.

23. The horizontal arm of the bell-crank lever 244 (which is rocked counterclockwise as seen in Fig. 8, by the button 16, as explained in Par. 19), has an inclined cam-slot 694 engaged by a finger 695 (Fig. 9) extending laterally from a horizontal swinging arm 696 fulcrumed on a stud depending from the keyboard frame section 1. When the lever 244 is rocked as indicated above, the cam-slot 694 swings the finger 695 and arm 696 clockwise as seen in Fig. 9. The end of the arm 696 extends into a grooved collar 697 fixed to the pinion 210, which, as explained in Par. 14, is fixed on the cam shaft 179 and is rotated (to rotate the cam shaft) by the reciprocatory rack 211. The collar 697 being fixed to the pinion it will be seen that when the arm 696 is rocked as described the shaft 179 is moved axially toward the right of the machine and the rack 211 is slid out on the wrist pin by which it is connected to the upper end of the actuating arm 213. The shaft 179 not only carries and rotates the adding cams (Fig. 23), as explained in Par's 11, 12 and 13, but also carries and rotates the subtracting cams (described in Par. 32 hereinafter). Normally the adding cams are in operative position, but when the shaft 179 is shifted axially by turning the subtraction knob 16 the adding cams are moved out of and the subtracting cams are moved into operative position.

24. If the subtraction button 16 is only partly turned and the attempt is made to operate the machine, serious injury to various parts might result. To prevent such an occurrence, provision is made whereby partial movement of the button will cause the machine's actuating mechanism to be locked. For this purpose the stud 698 on the arm 857 (Fig. 8) which moves with the rockshaft 60 is provided with a squared end which, when the arm 857 is in home position, (Fig. 8), lies to the front of the end of a stop 699 pivoted on a suitable stationary element, not shown. On the stop is an upwardly-inclined finger 700. With the parts in normal position, shown in Fig. 8, a spring 701 holds the finger 700 against the underside of the stud 243 on the bell-crank lever 244 and the end of the stop 699 above and out of the path of the stud 698. When the button 16 is turned and lever 244 rocked, the stud 243 swings the finger 700 and depresses the stop 699. If the button is only partly turned the stop is swung into the path of the stud 698 and the arm 857 is therefore locked, but if the button is turned to the full extent, thereby properly actuating or positioning the parts connected with it, the advancing stud 243 passes beyond the finger 700 and hence allows the stop to swing up out of the path of the stud 698 and come to rest against the stud 243. It is also important, to prevent injury to the machine, that the subtraction button be locked in normal position when the machine is performing other operations and be locked (beyond the control of the operator instead of merely by the manually controlled locking finger 666, described in Par. 18,) in operative position when the machine is subtracting. For this purpose an arm 703 (Fig. 8) is provided, fixed to a pivot 704 and depending into the path of the stud 698. Fixed to the same pivot is a vertical dog 706 having at its upper end a tooth 707. With the arm 857 in home position the arm 703 is held to the right as seen in Fig. 8, thereby holding the dog in the position shown, to the left and out of the path of a pin 708 on lever 244. If the lever 244 is in normal position, as shown, the tooth 707 comes above the pin and locks the lever and the button 16 when the shaft 60 is rocked counterclockwise, and if the button and lever have been actuated as described in Par. 20, the pin is above its initial or normal position and the locking tooth comes under it thereby locking the lever and button against homeward movement. When the arm 857 returns to normal or home position the stud 698 swings the dog back, which withdraws the tooth 707 from the path of the pin 708 and unlocks the lever 244 and subtraction button 16.

25. The subtraction button 16 having been turned, with the results described in Par's 19, 20, 21, 22, 23, the next step in the subtracting operation is to depress the subtraction key M (Fig. 12) which, it will be remembered (see Par. 20), is unlocked by turning the button 16. When the key M is depressed its stud 678 (Figs. 31, 12 and 13) engages and depresses the contiguous end of a member 710 pivoted at its forward end to lever 263 which is fulcrumed at 264 and pivoted at its forward end (away from the operator) to the long lever 266. The member 710 has a vertical slot 711 engaging a headed pin 712 on the lever 263, so that depression of the member 710 by the stud 678 on key M simply brings the top of the slot down upon or very close to the pin but does not rock lever 263. It does, however, bring a pointed finger 713, on member 710, below the adjacent pointed end of a short arc-shaped cam-rib 714 (Fig. 30) on the sector 261, Fig. 12, so that when the sector is rocked counterclockwise (as seen in Fig. 12) the rib will ride up on top of the finger and depress the same further. The member 710 being already locked to the lever 263 by the top of slot 711 (Fig. 30) bearing on the pin 712, it will be seen that the aforesaid further depression of the finger 713 (and hence member 710) rocks the lever 263 clockwise as seen in Fig. 13, thereby rocking the long lever 266 (Fig. 14) in the same direction. As explained in Par. 35, such actuation of lever 266 results in quick depression of the computing gears 151 into mesh with the racks 104 before the latter are advanced.

26. *Subtracting operation.*—The subtraction button 16 having been turned and the the subtraction key M having been depressed with the results described in Par's 19-25 inclusive, and the subtrahend having been set up on the keyboard, the shaft 60 is rocked clockwise (as seen in Fig. 13) by suitable means not shown. This rocks the sector 261 and, by actuation of the long lever 266 (Fig. 14) as described in Par. 35, depresses the computing gears 151 into mesh with the racks 104 by raising the link 162 and thereby rocking shaft 157 and bell-cranks 153, 154; this depression of the gears occurring before the racks are advanced. The described rocking of the shaft 157 also rocks shaft 184ª and, by the resulting depression of the fingers 184ᵇ, Fig. 27, unlocks the carrying racks 181, as explained in Par. 22. Such of the racks 104 as are free to move are now advanced and are eventually halted by the arrest of the associated controlling members 107 as explained in Par. 1. The advancing racks 104 rotate the computing gears 151 clockwise, (as seen in Fig. 17, for example), that is, opposite to the direction of the arrow in said figure. The rocking of shaft 157 to depress the gears 151 into mesh with the racks 104 before the latter are advanced also moves the hooked member 686 (Figs. 8 and 11) toward finger 693 until the hook 686a overlies the finger, after which the cam 690 rocks lever 688 counterclockwise thereby depressing the hooked member. This rocks the finger 693 and shaft 180 clockwise, which brings against the studs 207 (Figs. 19 and 17) of such carrying racks 181 as are in retracted position the edges 208a of the associated fingers 202 and advances such retracted racks (all of them) one tooth. It will therefore be seen that when the racks 104 begin to advance, with the computing gears 151 depressed into mesh with racks 104 and out of mesh with racks 181, the racks 181 are all one tooth in advance (that is, toward the operator) of their normal or rearmost position;—some or all of the racks 181 having been either left in such advanced position by a previous computing operation or moved to such advanced position by the respective fingers 202.

27. The subtraction dog 715 (Fig. 19) is pivoted to a bracket 716 on the lever edge of the carrying rack 181 near the shaft 180 and extends toward the subtracting cam 715a. Normally the free end of the dog is out of the path of the cam, as shown in Fig. 19. The dog has an angular slot 717, engaged by a lateral stud or pin 718 on the lever 188. Since the carrying rack 181 has no vertical movement either up or down, and since the lever 188 is pivoted on the trip-lever 190 which is in turn carried by the frame 176 and is therefore swung down with the gears 151, it will be seen that when the said gears are depressed into mesh with racks 104 the dog 715 is swung down into the path of the subtraction cam and that the pin 718 is at the same time shifted over (rightwardly as seen in Fig. 19) toward the incline in the cam slot 717. Then when the carrying rack 181 is advanced (by the fingers 202 as described in Par. 26) the lever 188 is rocked counterclockwise on its fulcrum 205 as seen in Fig. 19, thereby moving the stud 718 into the inclined portion of the cam-slot and hence swinging the dog 715 up and out of the path of the subtracting cam.

28. Referring now to Fig. 17 and making the same assumption with respect to the same as were made in Par. 9, it is further assumed, merely as an example, that the minuend or number already "in the machine" is fifteen. This means that the computing gear 151 and numeral wheel 150 are at the "one position" and that the disk 173 is in the "five position." It is also assumed that the subtrahend or number to be subtracted is seven. As the disk 173 revolves clockwise (opposite to the arrow) the tooth 174 engages the pivoted dog on the end of lever 190 (swinging the dog back against stud 189b) and then passes the dog, thereby rocking the lever clockwise. This swings lever 188 clockwise on the pin 206 as a fulcrum and hence moves the stud 718 (Fig. 19) out of the inclined portion of cam-slot 717 and into the horizontal position, thereby swinging the dog 715 down and again into the path of the subtracting cam 715a. The clockwise movement of lever 190 also depresses the finger 191 and allows the detent 193 to drop as described in Par. 10, bringing its lateral finger 194 into the path of cam 195. It may be stated here that the subtraction dog 715 is also depressed in the adding operation of the machine, but at such time the subtraction cam is not in the plane of the dog and hence does not coöperate therewith. At the same time the adding cam is not in the plane of the dog, for the reason that, as shown in Fig. 18 for example, the adding and the subtracting cams are spaced closer together than the dogs 188 and 715. It will thus be seen that when the cam shaft 179 is shifted to the subtracting position, as described in Par. 23, the adding cam lies between the dogs, and when shifted back the subtracting cam lies between the dogs.

29. The disks 173, Fig. 17, having come to rest, the shaft 60 nears the end of its rocking movement and causes the gears 151 to be raised out of mesh with the racks 104 in the following manner: On the radial arm 720 (Fig. 14) of the sector 169 is a stud 721 engaging a long slot 722 in the rear end of a link 723 having at its forward end a shoulder 724, and having a slot 725 engaged by a pin 726 on the end of a horizontal arm 727 rigidly connected to the vertical arm 224. As explained in Par. 21, turning the subtraction button 16 causes the arm 224 to swing counterclockwise (as seen in Fig. 14), thereby raising arm 727, which lifts the shoulder end 724 of the link 723. On the link 162, which, as explained in Par. 35, is raised to depress the computing gears 151 into mesh with the racks 104, is a depending finger 798 having at its lower end a lateral pin 729, engaged by the forked bell-crank lever 730, fulcrumed loosely on shaft 117. Manifestly, when the link 162 is raised (the lever 164 being locked with its slot inclined as shown) the lever 730 is rocked counterclockwise as seen in Fig. 14, thereby swinging the stud 731 on its shorter arm down into the path which is traversed by the shoulder 724 after the link 723 has been raised as described. During the greater part of the swing of sector 169 clockwise (as seen in Fig. 14) the lost motion afforded by the long slot 722 keeps the link 723 in its initial position; but as the sector nears the end of its clockwise swing the stud 721 reaches the end of the slot and advances the link, bringing the shoulder 724 against the stud 731 and rocking the bell-crank 730 clockwise. This depresses the link 162. Since the lever 164 is locked by the lever 167 coöperating with the stop 338a, (Par. 21, near the end), the lever is held with its slot in its normally inclined position, and hence the downward movement of stud 163 in said slot as the link 162 is depressed moves the latter to the left (as seen in Fig. 14), rocking shaft 147 and raising the gears 151 out of mesh with the racks 104 through the agency of the bell crank levers 153, 154, before the racks start home. At the same time the cam 690 (Fig. 8) permits the hooked member 686 to rise, which in turn allows the spring 235 (already tensioned as described in Par. 19) to swing the fingers 202 counterclockwise (as seen in Fig. 17) thereby withdrawing the edge 208a from the stud 207 and hence leaving the rack 181 free to be retracted toward the shaft 180.

30. The computing gears 151 having been raised out of mesh with the racks 104 as explained in the preceding paragraph, the main shaft 60 rocks back to its initial position, thereby rotating the cam shaft 179 and subtracting cam 715a clockwise (as seen in Figs. 8 and 19, for example) by the means described in Par. 14. The dog 715 being in the path of the subtracting cam, the carrying rack 181 being advanced (toward the operator) one tooth, and the gear 151 being in mesh with the carrying rack, the clockwise-moving cam pushes the dog 715 backward a distance equal to one tooth on the rack, thereby rotating the gear 151 and number disk 150 one step in the clockwise direction. After the subtracting cam retracts the carrying rack, the cam 195 engages the finger 194 (which is offset laterally so that it can be engaged by the said cam even though the latter is shifted axially with the cam shaft 179 as described in Par. 23), and rocks the detent 193 clockwise to the position shown in Fig. 27. This unlocks the rear end of the trip lever 190 by releasing its finger 191 (see Par. 10, at the end thereof) and permits the spring 196, Fig. 26, to restore the trip lever to initial position with its pointed dog 189 in the path of the teeth 174, 175, on disk 173. This movement of the lever 190 swings lever 188 counterclockwise (Fig. 27) on the pin 206 as a fulcrum, thereby restoring its foot 187 to initial position; said lever 188 having previously been rocked clockwise as seen in Fig. 27, by the rocking of lever 190 as the tooth 174 passes under its pointed dog 189.

31. As the main shaft 60 rocks back to home position the parts actuated by the forward movement of the shaft are restored to initial position; except such carrying racks as were not retracted by the respective dogs 715. These are left in advanced position and in mesh with the respective gears 151, as in Par. 10, in which the adding operation is described. Then if the next operation of the machine is another subtraction the advanced racks are already in position for retraction by the subtraction cams, but if the next operation is any other than subtraction the advanced racks are returned to and locked in initial position in the manner described in Par. 12; it being understood that the return of the subtraction button 16 to initial position as described in Par. 18 relaxes spring 235 (Fig. 8) and re-tensions spring 234. After the subtracting operation is completed, the subtraction button 16 remains in position for another subtraction but the subtraction key M is raised to initial position by the spring 710a, Fig. 31. At the same time, spring 710b raises lever 710 to its normal position with respect to the lever 263.

32. *Subtractive helix, and actuation of same.*—For the purpose of subtraction the computing mechanisms are equipped alike except that the lowest order has no subtracting cam (since there is no "borrowing" from such order) and that the subtracting cams, b16, c16, . . . i16, Fig. 22, for the other orders, are constructed and arranged to have their operative edges in the form of a helix, in a manner analogous to the construction and arrangement of the adding cams shown in Fig. 23 and described in Par. 13.

33. *Clearing the machine.*—Since the accumulating or computing gears 151 are rotated counterclockwise (as seen in Fig. 1, for example) in the adding operation of the machine, it is evident that if the said gears are rotated in the opposite direction and are arrested when they and the associated disks 173 reach the "zero position" the machine will be "cleared." Since the gears 151 and the associated disks 173 are rotated in the adding direction by the homeward or retracting movement of the sliding racks 104 (see Par. 4), after the said gears have been brought into mesh with the racks 104 by proper actuation of the bell crank supports 154, 153, as explained in Par's 4 and 5, it will be seen that by depressing the gears into mesh with the racks 104 before the advancing movement of the latter the gears will be given the clockwise rotation required for the clearing operation. As explained in Par. 1, the racks 104 are normally held against the above described advancing movement by the plates 30 (Fig. 1), but when any digit key is depressed the associated plate 30 is swung down out of the path of the corresponding rack 104. Inasmuch as, obviously, no digit key should be depressed when the machine is to be cleared, it is plain that the plates 30 must be depressed by other agencies. It will now be seen that to clear the machine four operations must be performed: (1) The plates 30 must be depressed to unlock the racks 104; (2) the gears 151 must be depressed before the racks 104 are advanced; (3) the racks 104 must be advanced (by the sliders 100), thereby rotating the gears 151 in the clearing direction and (4) the gears 151 must be arrested when they reach the zero position.

34. Clearing operation No. 1, described in the preceding paragraph, is performed by the following devices: The total or clearing key T, Figs. 12, 13, 14, 30, is first depressed. Since the foot of the key bears on the stud 84 fixed to the swinging frame or lever 85 fulcrumed on the transverse shaft or rod 102, depression of said key swings the frame 85 clockwise as seen in Fig. 13. This shifts the stud 86 to the right with respect to the engaging forked end of the link 250, Fig. 13, which link is normally locked or held in the position shown by the said stud 86. When the stud is shifted as described, the spring 251 is permitted to advance the link 250 toward the right, thereby swinging in the counterclockwise direction the arm 252 fixed to and depending from the left end of the transverse shaft 35. This shaft has fixed to it a series of fingers 34 (see Fig. 1, for example, and Par. 1) so that when the shaft is rocked by the described actuation of the arm 252 the fingers 34 are swung forward, thereby throwing forward the arms 31, which are engaged by pins 33 extending laterally from the fingers 34 into the slots 32 and are pivotally carried by the arms 27. This advance of the arms 31 brings their upwardly open notches 253 (Fig. 1) into the paths of the studs or pins 254, extending laterally from the vertical arms 255. These arms 255 are pivoted on the frames 176 of the transfer mechanism, which frames partake of the up and down movements of the gears 151, as explained in Par. 9. The arms 255 are drawn toward the shaft 152 (see Fig. 19) by light coil springs 256, causing the studs 254 to bear on the disks 257 which, as shown in Fig. 4, are mounted loosely on the shaft 152 and connected rigidly to the adjacent gears 151 and numeral wheels 150. The disks 257 have in their peripheries two diametrically opposite notches 258, so arranged that when any gear 151 and its associated disk 173 and wheel 150 are at "zero position" one or another of said notches will be in front of the stud 254 on the coöperating arm 255. When any disk 257 is not in the position just mentioned, the associated stud 254 bears on the edge of the disk and is therefore held out immediately above the notch 253 on the arm 31 when the latter is swung forward as described. Now when the frames 176 are depressed, by the bell crank levers 153, 154, through the medium of the shaft 157, as described in Par's 5 and 6, the stud 254 also moves down and, engaging the notch 253, depresses the arm 27 on which, as explained in Par. 33, the arm 31 is pivoted. This swings the plate 30 down out of the path of the rack 104, leaving the latter (and, of course, the slider 100, which carries the rack) free to move forward. When, however, any gear 151 and the associated disk 173 and numeral wheel 150 are already at zero position (and, therefore, need not be rotated in the clearing operation) one of the notches 258 in the associated disk 257 is opposite the stud 254 on the coöperating arm 255. This permits the spring 256 to advance the arm 255, throwing the stud 254 into the notch 258, thereby carrying the said stud away from above the notch 253 in the advanced arm 31. Then when the arm 255 is depressed, as described above, the stud thereon passes idly by the notch 253, leaving the arm 31, and hence the plate 30 also, in the upper or locking position, so that the associated rack 104 and slider 100 cannot advance.

35. Clearing operation No. 2 of Par. 33, to wit, the downward movement of the computing gears 151 to bring them into mesh with the racks 104 before the latter are advanced in the clearing operation of the machine, is effected as follows: When depression of the total key T (Fig. 12) depresses the swinging frame 85 the pointed finger 259 fixed on the right hand side of the frame is carried below the pointed end of an arc-shaped rib 260, Fig. 13, on the left hand side of a sector 261 fixed on the main rock-shaft 60. Then when the shaft 60 is rocked by the operator the rib 260 is swung into engagement with the finger 259 and cams the same down, thereby depressing the frame 85 still farther than it was depressed by the clearing key T. The movement of the said frame by the total key brings a stud 262 (Figs. 12 and 30) down upon the rear end of a lever 263 (Figs. 13 and 31) which is fulcrumed at 264 on a stud carried by the side frame 4. Hence when the frame 85 is further depressed by the action of the cam rib 260, the stud 262 rocks lever 263 clockwise (as seen in Fig. 13) on its pivot 264. This raises the forward end of the lever, which end, as shown in Fig. 14, is pivoted to a lug 265, depending from a long horizontal lever 266 fulcrumed at 264 on the side frame 4 and having its forward end (its left end as seen in Fig. 14) connected by a short link 268 to a long link 162. The lug 265 being quite near the fulcrum 264 the slight upward movement of said lug by the described actuation of lever 263 gives a relatively long upward swing to the forward (or left) end of lever 266; and since this end is connected (by link 268) to about the middle of link 162, the lift of the latter by lever 266 raises stud 163 (on the end of link 162) very quickly. The slot in member 164 which is engaged by the stud 163 is inclined upwardly toward the operator; and since the member 164 is positively held against rocking movement by the arc-shaped locking piece 170 (see Par. 6), it is clear that the quick upward movement of stud 163 must cause the link 162 to advance toward the operator, that is, toward the right in Fig. 14. This rocks the shaft 157 and causes the shaft 152 to be depressed, thereby bringing the gears 151 into mesh with the racks 104, as explained in Par. 5. The downward movement of shaft 152 also swings the transfer mechanism frames 176 down, with the results described in Par. 34.

36. *Clearing operation No. 3.*—It is explained in Par. 1 that the sliders 100 and rack 104 are advanced by the gear segments 106 and rack members 105 after the sliders have been picked up by the fingers 114 on the levers 112 carried by the sliders, and that the said levers 112 are rocked to effect this result after the arms 37 are actuated as described in Par. 1. Inasmuch as these arms are connected with the arms 31 (as shown in Fig. 1) it is evident that when the arms 31 are depressed, as described in Par. 34, the associated arms 37 are actuated. Hence when the gear segments 106 are rocked toward the operator the sliders 100 and racks 104 that have been unlocked by depression of arms 255 and 31 are advanced after the gears 151 have been lowered into mesh with the racks. In this manner operation (3) of Par. 33 is performed.

37. Clearing operation No. 4 of Par. 33 is performed as follows: Alongside of the disks 257 (Fig. 4 and Par. 34) on the shaft 152 and fixed to the respective disks 257 is a series of disks 270 (Figs. 5 and 6), each having two diametrically opposite teeth 271 suitably located with respect to the teeth 174, 175 on disks 173 and to the zeros on the numeral wheels 150. The dogs 272 (Fig. 21), pivotally and slidably mounted on the studs 273 fixed to the stationary transfer-mechanism frames 184, have at their rear ends lateral pins 275 resting against the tips of the fingers 276 having curved cam edges 277. These fingers are rigidly mounted on the transverse shaft 101. Normally the fingers 276 stand in the position shown in Fig. 21, with the notches at their tops engaging the pins 275 on dogs 272. The latter are therefore normally locked against rearward movement (toward the operator) because held by the fingers 276, and against forward movement because held by the pivots 273, as shown, and are also held with their heads 274 out of the paths of the teeth 271. However, just after the operator begins to rock the gear segments 106 and shaft 60 toward him the fingers 276 are rocked counterclockwise (as seen in Fig. 21) by the following mechanism: The finger 276 at the left hand side of the machine, Figs. 12 and 13, has a depending tail 279 connected by a link 280 to the upper arm of a three-armed lever 281 fulcrumed at 282 on an arm 283 fixed to the side frame 4 at 284. The horizontal arm of this lever carries a pivoted dog 285, the pivotal movement of which is limited by the ears 286, 287, Fig. 13, coöperating with a lateral pin 288 on the lever. A spring 289 (Figs. 12 and 13) connected to the depending arm of the lever 281 urges the latter counterclockwise (as seen in Fig. 13) thereby holding the dog 285 in contact with the edge of a cam 290, fixed on the transverse shaft 443, which, as described in Par. LXXXVI of my application Serial No. 759,261, is rocked clockwise (as seen in Fig. 13) as the gear segments 106 and shaft 60 are rocked toward the operator, and counterclockwise as the said segments and shaft return to home position. Normally, the dog 285 stands up on its long leg 285a against which the lug 290a of the cam bears. As the cam rocks counterclockwise (Fig. 12) the dog 285 rocks clockwise on its leg 285a, thereby permitting the spring 289 to rock lever 281 clockwise, which advances the link 280 and rocks shaft 101, thereby swinging all the fingers 276 away from the pins 275 on the dogs 272 almost instantly after the operator starts to swing the gear segments 106 and shaft 60 toward him. The dogs 272 are then free to advance. When the cam 290 swings back to home position the lug 290a strikes the toe 285 and causes the dog 285 to swing counterclockwise (as seen in Fig. 12) again, until the ear 287 strikes the pin 288. The dogs 272 (Fig. 21) being unlocked as above described, some or all the racks 104 are advanced (as explained in Par. 36) with the gears 151 in mesh therewith. This rotates the associated disks 270 clockwise (as seen in Fig. 21, for example) and brings one of the teeth 271 against the rear of the head 274 on dog 272. The disks continuing their rotation, the engaging teeth 271 draw the dogs 272 forward. On each dog is a pivoted pawl 292 (Fig. 21) engaging the ear 293 of a second pawl 294 fulcrumed at 295 on a depending arm 296 of the adjacent frame 184 (Fig. 19). The upturned tail 297 (Fig. 21) of dog 294 engages a shoulder 298 on dog 272. When the dog 272 is advanced by a tooth on disk 270, as described, the pawl 292 advances also and hence swings dog 294 down, bringing its tooth 299 into engagement with the appropriate tooth on a ratchet 300, Fig. 1, at the top of the associated stepped controlling member 107 and arrests the latter. As explained in Par. 2, arrest of a stepped controlling member stops the associated slider 100 and rack 104. Hence, when a stepped member 107 is arrested by the dog 294 being brought into play by a tooth on the associated disk 270 engaging the head of the dog 272, the slider 100 and rack 104, and the gear wheel 151 which is in mesh with the latter, are also arrested. The coöperating parts are so proportioned that the gears 151 are arrested at the zero position, with zeros on the numeral wheels 150 appearing at the long transverse window 11 in the casing 10, Fig. 14. Just before the shaft 60 reaches the end of its forward swing (toward the operator) the stud 171 (Fig. 14) on the clockwise moving sector 169 engages the tail of lever 167 and rocks the same counterclockwise. At this time the stud 163 is at the top of the slot in lever 164. Hence actuation of the last named lever by lever 167 (as described in Par. 6) does not shift the link 162 toward the operator but shifts it in the opposite direction, thereby rocking the bell-cranks 153, 154, counterclockwise (as seen in Fig. 14) and therefore raising the gears 151 out of mesh with the racks 104. The sliders 100 and racks 104, with the associated parts, are then returned home as described in Par. 1, the ratchets 300 on the stepped members 107 passing idly under the teeth of the dogs 294. About the time the sliders 100 reach the home position the shaft 101 is rocked clockwise (as seen in Fig. 21, for example) by the lever 283, thereby rocking the fingers 276 in the same direction. The curved cam edges 277 of these fingers being in engagement with the studs 275 on the dogs 272, the latter are drawn back and their heads depressed, causing their shoulders 298 to swing the dogs 294 up to initial position. (The arm 283, Fig. 12, is not connected at its left end to the vertical member or link 222 as would seem from the figure mentioned, but is extended merely to serve as a point of attachment for the spring which is connected at its lower end to the detent 172).

38. In the adding operation of the machine the gears 151, and hence the disks 270 also, are rotated counterclockwise, as seen in Fig. 21 for example, and as described in Par. 4. In this operation the teeth 271 on said disks pass idly over the heads 274 of dogs 272 thereby depressing the same. This downward movement does not depress the dogs 294, for the reason that the down-swinging dogs 272 cause the pawls 292 to rock on the ears 293 as fulcrums, extending the coil springs 301 (which serve to hold the pawls in proper position with their toes in engagement with said ears), while the shoulders 298 coöperating with the tails 297 prevent the dogs 294 from swinging down.

39. To lock the machine against operation when the clearing key T is only partly depressed, thereby compelling the operator to depress the key completely when he desires to clear the machine, the following mechanism, shown in Figs. 12, 13, 14 and 16, is provided: On the frame 85, which, as explained in Par. 34, is given a preliminary swing clockwise, as seen in Fig. 13, by depression of the clearing key T, is a pointed stud 360 coöperating with the pointed head of a vertical arm 361 fixed at its lower end to a pivot 362 mounted in the side frame 4 at the bottom thereof. the arm 361 being inside the frame 4. Fixed to the same pivot but outside the frame 4 is a vertical arm 363, Fig. 16, pivotally connected at its top by a link 364 to a depending arm 365, pivotally mounted on the end of the rod or shaft 13. On the sector 169, which is fixed to the main shaft 60 and therefore swings therewith, is a stud 366 having a flat top; the position of the stud when the sector is in home or normal position, being below and behind the lower end of the arm 365. When the frame 85 is rocked by partial depression of the clearing key T, the camming effect of the stud 360 on top of the arm 361 swings the latter forward (rightwardly as seen in Fig. 16), thereby advancing the link 364 and bringing the lower end of arm 365 wholly or partly into the path of the stud 366. Hence the sector 169 cannot be rocked and the machine is therefore locked. But if the total key is wholly depressed the frame 85 is rocked far enough to carry the stud 360 down past the head of the arm or lever 361, thus permitting the arm 365 to be swung back to its normal position, out of the path of the stud 366, by the spring 367 (Fig. 12) thereby retracting the arm 361. It will therefore be seen that no damage can be done by attempting to operate the machine when the clearing key is improperly manipulated, since the main shaft 60 is locked when the key is only partially depressed.

40. *Printing mechanism.*—If the machine is equipped with printing mechanism (for example that described in my prior and copending application Ser. No. 759,261, before referred to) the sliders 100 (Figs. 1 and 2) can be conveniently utilized to "set" the printing mechanism to print each item and to print the total accumulation at the time the clearing operation takes place, since, as explained in Pars. 2 and 37, the extent of advance of the sliders is proportional to the numerical values of the digits composing the item set up on the keyboard or to the digits composing the accumulation. When printing mechanism is provided, the numeral wheels 150, Figs. 3 and 4, are convenient but are not necessary and I have accordingly not made them an element of the claim. On the other hand, a machine which has no printing mechanism should be equipped with numeral wheels if it is provided with means for rotating the computing gears 151, to zero position and back again, (that is, without clearing the machine), to exhibit to the operator the "subtotal."

41.—*Taking a subtotal.*—In the subtotal operation, referred to in the preceding paragraph, it is clear that the principles of operation are the same as explained in Par. 33 for the clearing operation, except that the computing gears 151, Fig. 1 are not shifted out of mesh with the actuating racks 104 when the gears are rotated to the zero position by the advancing racks but are kept in mesh therewith so that when the racks are retracted to home position the gears will also be rotated back to the positions occupied by them before they were rotated by the advance of the racks; after which the gears are raised to normal position. It will therefore be seen that for a complete understanding of the subtotaling operation it is now necessary to explain only the means by which the gears are kept in mesh with racks during the entire reciprocation of the same.

42. In order to keep the gears 151 in mesh with the racks 104 during their entire reciprocation, for the purpose of the subtotaling operation briefly described in Pars. 40 and 41, the machine is equipped as follows: At the left of the machine and adjacent to the total or clearing key T, Figs. 12, 13, 14, 30 and 32, is a subtotal key S, provided with a foot 325 below which is a stud 86 on an upwardly extending arm of the swinging frame 85, so that when the key S is depressed the frame will be rocked (counterclockwise as seen in Fig. 12) and the stud shifted rearwardly, or leftwardly. The pin 326, Fig. 13, on the subtotal key swings the forked arm 327 forward to meet the stud 86, so that the latter enters or is engaged by the fork of the arm 327. Then when the frame 85 is given its complete movement by the coöperation of the cam rib 260 and finger 259 as explained in Par. 35, the arm 327 is also given additional rearward movement. The arm 327 is pivoted at its lower end to a link 328 (Fig. 32) which is itself pivoted at one end to a swinging frame 329 and at the other end to the joint of the toggle 331, 332. Rearward movement of the link, caused by the described rearward movement of the forked arm 327 therefore buckles the toggle, as shown in Fig. 32. The upper end of the toggle is pivoted at 333, Fig. 14, to the fixed supporting member 334, and its lower link is pivoted at 235 to the movable member or yoke 336 on which lever 167 is fulcrumed as stated in Par. 6. Hence when the toggle is buckled as described, against the tension of the spring 337 which tends to keep the toggle straight, the yoke 336, pivoted at 338 on the support 334, is swung up. This raises the lever 167, carrying the tail out of engagement with the locking rib 170 and out of the path of the lug 171 and raising the upper end of the lever against the stop-finger 338a (Fig. 16) fixed on the adjacent end of the shaft or rod 13. The operation will now be readily understood. When the subtotal key is depressed with preliminary movement of the forked arm 327, the first result of rocking the shaft 60 toward the operator (clockwise as seen in Fig. 14) is to actuate the swinging frame 85, with instant depression of the gears 151 into mesh with the racks 104 as described in Par. 35. As this is occurring, the stud 86 reaches the bottom of the fork on the end of the arm 327, and just after the gears are brought into mesh with the racks the continued movement of the frame 85 causes the toggle 331, 332 to buckle, lifting the tail of lever 167 out of the path of lug 171 as described above in this paragraph. In the clearing operation the stud on lug 171 engages the lever 167, and, as described in Par. 37, causes the gears 151 to rise out of mesh with the racks 104 immediately after the said gears and associated disks have been rotated (in the "clearing" direction) to the zero position, so that when the racks move home again the gears 151, numeral wheels 150, etc., will be left at the zero position. In the present case, the lifting of lever 167 out of the path of stud 171 and into locking engagement with finger 338a prevents lifting of the gears 151, and, instead, compels them to remain in mesh with the racks 104. The racks 104 therefore advance, rotating the gears 151 and numeral dials 150, until arrested by the action of the disks 270 and dogs 294 (as described in Par. 37), but when the shaft 60 nears the end of its clockwise movement (toward the operator) the stud 171 on the sector 169 (moving clockwise as seen in Fig. 14) passes idly under the lever 167 and does the same when the sector starts in the opposite direction to return to initial position. The gears 151 therefore remain in mesh with the racks 104, and as the advanced sliders 100 and racks 104 are returned to home position by the means described near the end of Par. 1, the racks 104 rotate the gears 151, disks 173, 257 and 270, and the numeral wheels 150 back to the positions occupied by them before the gears were depressed into mesh with the racks 104.

43. The sliders 100 and racks 104 having been restored to home position as described in Par. 42 the shaft 152, carrying the gears 151, numeral wheels 150, etc., must be raised to disengage the gears from the racks. This is effected as follows: On the sector 169 is pivoted a finger or pawl 340 (Figs. 14 and 32) having an extension 341 held by a spring 342 against a stop 343 to prevent pivotal movement of the finger in the counterclockwise direction (as seen in Fig. 32). When the sector 169 is swung from the position shown in Fig. 14 to that shown in Fig. 32, the cam lug 344 on lever 266 Fig. 31 rocks the finger 340 idly on its pivot; but on the return movement of the sector 169 the finger is held rigid by the stop 343 and hence when it engages the cam-lug 344 it can pass only by raising the latter. This raises the rear end of lever 266 and swings link 165 down, carrying stud 163 down again in the curved slot in the member 164. The latter being held by the lever 167 and coöperating stop 338a, the downward movement of stud 163 must move link 162 to the right (as seen in Fig. 32) thereby rocking shaft 157 counterclockwise and swinging the bell-cranks 153, 154 in the opposite direction, which raises the shaft 152 and lifts gears 151 out of mesh with racks 104, as explained in Par. 5. As the sector 169 arrives at its home position the end of finger 340 escapes from the cam lug 344, leaving the lever 266 in raised or normal position. At the same time the cam rib 260 escapes from finger 259 and permits spring 345 (Fig. 12), attached to stud 346 on frame 85, to swing the latter back to initial position. Spring 337, Fig. 14, is also permitted to straighten toggle 331–332, bringing lever 167 back into contact with the locking rib 170. The return movement of frame on lever 85 carries stud 86 out of the notch on the upper end of the arm 327 (Fig. 13), thereby permitting said arm to be restored to normal position (by its springs 347) against the stud 326 on the subtotal key S, already raised to initial position by its restoring spring 318.

It is to be understood that the invention is not limited to the particular construction herein illustrated and described, but can be embodied in various forms without departure from its spirit.

I claim:

1. In a calculating machine, in combination, a series of reciprocatory actuating racks representing consecutive numerical orders; a series of reciprocatory carrying racks; a series of computing gears having a zero position and movable into mesh with one series of racks and out of mesh with the other; a series of actuating dogs, each pivotally connected to a carrying rack, to actuate the same; a series of cams to return the dogs; and a series of trip levers each pivoted to an actuating dog and arranged for actuation by the gear of the order next below as the same rotates to the zero position, whereby to swing the dog on its movable connection with the respective carrying rack and into position for actuation by the appropriate cam.

2. In a calculating machine, in combination, a pair of independently rotatable gears representing consecutive numerical orders and having a zero position; a toothed carrying member to rotate the gear of the higher order, and suitable means to shift the said gear into and out of mesh with the carrying member at appropriate times; means to rotate the gear of the lower order; a cam; a carrying dog pivoted to the carrying member to actuate the same and normally out of the path of the cam; a trip lever connected with the dog to shift the same into the path of the cam and arranged for actuation when the gear of the lower order reaches the zero position; a detent to lock the trip lever after actuation thereof; mechanism to actuate the cam after actuation of the trip lever; and means for shifting the detent to unlock the trip lever after the same has actuated the carrying dog.

3. In a calculating machine, in combination, a pair of independently rotatable computing gears representing consecutive numerical orders and having a zero position; a toothed carrying member to rotate the gear of the higher order, and suitable means to shift the said gear into and out of mesh with the member at appropriate times; a pawl coöperating with the carrying member to lock the same; a trip lever operable when the gear of the lower order reaches the zero position and associated with the said pawl to shift the same to unlock the carrying member; a carrying cam; a dog connected with the carrying member to actuate the same and with the trip lever for movement thereby into the path of the carrying cam; means to actuate the cam after operation of the trip lever; means operating automatically to lock the trip lever after actuation thereof; means to unlock the trip lever after actuation of the cam; and means to rotate the gear of the lower order.

4. In a calculating machine, in combination, a pair of independently rotatable computing gears representing consecutive numerical orders and having a zero position; a toothed carrying member to rotate the gear of the higher order, and suitable means to shift the said gear into and out of mesh with the member at appropriate times; a carrying cam; a dog connected with the carrying member to actuate the same and normally out of the path of the cam; a trip lever operated as the gear of the lower order reaches the zero position and connected with the dog to shift the same into the path of the cam; a detent to lock the trip lever after the dog is shifted into the path of the cam; a cam to shift the detent out of locking position to release the trip lever after actuation of the dog by the carrying cam; means to actuate said cams; and means to rotate the gear of the lower order.

5. In a calculating machine, in combination, a pair of independently rotatable computing gears representing consecutive numerical orders and having a zero position; a toothed carrying member to rotate the gear of the higher order, and suitable means to shift the said gear into and out of mesh with the member at appropriate times; a dog connected with the carrying member to advance the same; a movable finger to retract the carrying member and lock the same in retracted position; means for actuating the finger to unlock the member; a carrying cam to actuate the dog; a trip lever operated as the gear of the lower order reaches the zero position and connected with the dog to shift the same into the path of the cam for actuation thereby; a spring-actuated pawl coöperating with the carrying member to lock the same in retracted position; a stud carried by the trip lever to swing the pawl out of locking position when said lever is operated; a detent to lock the trip lever after the dog is shifted into the path of the cam; a cam timed to shift the detent out of locking position after actuation of the dog by the carrying cam; means to actuate the said cams; means to restore the trip lever to initial position; and means to rotate the gear of the lower order.

6. In a calculating machine, in combination, a pair of independently rotatable computing gears representing consecutive numerical orders; a toothed carrying member to rotate the gear of the higher order, and suitable means to shift the said gear into and out of mesh with the member at appropriate times; an adding dog and subtracting dog arranged side by side and connected with the carrying member to shift the same in opposite directions; an adding cam and a subtracting cam arranged side by side to actuate the respective dogs; manually actuated means to shift the adding cam out of and the subtracting cam into operative position; and means to rotate the gear of the lower order.

7. In a calculating machine, in combination, a pair of independently rotatable computing gears representing consecutive numerical orders; a toothed carrying member to rotate the gear of the higher order, and suitable means to shift the said gear into and out of mesh with the member at appropriate times; an adding dog and a subtracting dog arranged side by side and connected with the carrying member to shift the same in opposite directions; an adding cam and a subtracting cam arranged side by side to actuate the respective dogs; a shaft on which the cams are rigidly mounted; manually actuated means to shift the shaft axially and thereby carry the adding cam out of and the subtracting cam into operative position; means to rotate the said shaft while the gear of the higher order is in mesh with the carrying member; and means to rotate the gear of the lower order.

8. In a calculating machine, in combination, a pair of independently rotatable computing gears representing consecutive numerical orders and having a zero position; a toothed carrying member to rotate the gear of the higher order, and suitable means to shift the said gear into and out of mesh with the member at appropriate times; an adding dog connected with the carrying member to shift the same in one direction; an adding cam to actuate the adding dog; means operated as the gear of the lower order passes the zero position to shift the adding dog into position for actuation by the adding cam; a subtracting cam; a subtracting dog connected with the carrying member to shift the same in a direction opposite to the movement imparted by the adding dog, and connected with the adding dog so as to be shifted thereby within the path of the subtracting cam; manual means for shifting the cams simultaneously to bring one into and the other out of operative position relative to the respective dogs; mechanism for actuating the cams; and means to rotate the gear of the lower order.

9. In a calculating machine, in combination, a pair of independently rotatable computing gears representing consecutive numerical orders and having a zero position; a toothed carrying member to rotate the gear of the higher order, and suitable means to shift the said gear into and out of mesh with the member at appropriate times; a subtracting dog connected with the carrying member to retract the same; a subtracting cam to actuate the dog; means for advancing the carrying member; means actuated by the advancing carrying member to shift the dog out of the path of the cam; means coöperating with the second named means to shift the dog back into the path of the cam as the gear of the lower order passes the zero position; means to actuate the cam; and means to rotate the gear of the lower order.

10. In a calculating machine, in combination, a pair of independently rotatable computing gears representing consecutive numerical orders and having a zero, position; a toothed carrying member to rotate the gear of the higher order, and suitable means to shift the said gear into and out of mesh with the member at appropriate times; mechanism to advance the carrying member while the same is out of mesh with the said gear; a dog connected with the carrying member to retract the same while in mesh with the said gear; a cam to actuate the dog; a lever connected with the carrying member and with the dog to shift the latter out of the path of the cam as the carrying member is advanced; means operating as the gear of the lower order passes the zero position to actuate said lever to shift the dog back into the path of the cam; means to actuate the cam after the dog is shifted back into the path thereof; and manually controlled means to rotate the gear of the lower order.

11. In a calculating machine, in combination, a pair of independently rotatable computing gears representing consecutive numerical orders and having a zero position; a toothed carrying member to rotate the gear of the higher order, and suitable means to shift the said gear into and out of mesh with the member at appropriate times; means to retract the carrying member while out of mesh with said gear; a dog connected with the carrying member to advance the same while in mesh with the said gear; a cam to actuate the dog; means connected with the dog and operable to shift the same into the path of the cam for actuation thereby; a trip lever for actuating said means; a device moving with the gear of the lower order and adapted to actuate the trip lever as the gear passes the zero position; manually controlled means to rotate the gear of the lower order; and means to actuate the cam while the gear of the lower order is in mesh with the carrying member.

12. In a calculating machine, in combination, a pair of independently rotatable computing gears representing consecutive numerical orders and having the zero position; a toothed carrying member to rotate the gear of the higher order, and suitable means to shift the said gear into and out of mesh with the member at appropriate times; an actuating dog connected with the carrying member; a cam to actuate the dog; a lever connected with the carrying member and the dog; means to advance the carrying member while out of mesh with the said gear, thereby rocking said lever in one direction to shift the dog out of the path of the cam; a trip lever connected with the first-named lever to rock the same in the opposite direction and thereby shift the dog back into the path of the cam; means moving with the gear of the lower order to actuate the trip lever as the gear reaches the zero position; means to rotate the last named gear; and mechanism to retract the cam while the dog is out of its path and advance the cam after the dog has been shifted into its path.

13. In a calculating machine, in combination, a pair of independently rotatable computing gears representing consecutive numerical orders and having a zero position; a toothed carrying member to rotate the gear of the higher order, and suitable means to shift the said gear into and out of mesh with the member at appropriate times; a trip lever; a lever connected by pivots to the carrying member and the trip lever and adapted to rock on either pivot as a fulcrum; a cam; an actuating dog connected with the carrying member and with the second-named lever to be shifted by the latter out of and into the path of the cam; means for advancing the carrying member while out of mesh with the gear of higher order, whereby the second-named lever is rocked on its pivotal connection with the trip lever and the dog is shifted out of the path of the cam; means moving with the gear of lower order to rock the trip lever on its pivotal connection with the advanced carrying member and thereby shift the dog back into the path of the cam as the gear passes the zero position; means for rotating the gear of lower order; and means to actuate the cam while the dog is in the path thereof and the gear of higher order is in mesh with the carrying member.

14. In a calculating machine, in combination, a pair of independently rotatable coaxial computing gears representing consecutive numerical orders and having a zero position; a toothed reciprocatory carrying member above the gear of the higher order to rotate the same; and suitable means to shift the said gear into and out of mesh with the member at appropriate times; a cam below the gears; a dog extending rearwardly from the cam and pivoted at its rear end to the carrying member and having a cam slot; a vertical lever pivotally connected at its upper to the carrying member and having a stud engaging the said cam slot; a trip lever fulcrumed adjacent to the carrying member and pivoted to the vertical lever above the stud thereon; means to advance the carrying member while the same is out of mesh with the gear of higher order, whereby the vertical lever is rocked on its pivotal connection with the trip lever and the dog is swung up out of the path of the cam by the said stud and cam slot; means for retracting the cam while the dog is out of the path thereof and advancing the cam while the dog is in said path; means moving with the gear of lower order to rock the trip lever on its pivotal connection with the carrying member to swing the dog down into the path of the cam as the gear of lower order passes the zero position; and manually controlled means to rotate the gear of lower order.

15. In a calculating machine, adding and subtracting mechanism comprising, in combination, a pair of independently rotatable computing gears representing consecutive numerical orders and having a zero position; a toothed reciprocatory carrying member to rotate the gear of the higher order and suitable means to shift the said gear into and out of mesh with the member at appropriate times; a dog connected with the carrying member to advance the same; a subtracting cam to actuate the dog; a lever connected with the carrying member and the dog; an adding cam, a trip lever pivoted to the first named lever; means moving with the gear of lower order to swing the first lever into the path of the adding cam and simultaneously shift the dog into the operative path of the subtracting cam at the appropriate time; manual means to shift the adding cam out of and the subtracting cam into operative position relative to the first-named lever and the dog; means to actuate the cams at the appropriate times; and mechanism to rotate the gear of lower order in either direction at will.

16. In a calculating machine, in combination, a pair of independently rotatable coaxial computing gears representing consecutive numerical orders and having a zero position; a toothed reciprocatory carrying member above the gear of the higher order to rotate the same; a stationary frame on which the carrying member is mounted; a pivoted frame carrying the gears; means to swing the pivoted frame downwardly and upwardly at appropriate times to shift the gear of higher order into and out of mesh with the carrying member; a cam journaled in the pivoted frame; a trip lever fulcrumed on the pivoted frame; a dog to advance the carrying member, connected with the carrying member and the trip lever and shiftable by the latter into the path of the cam for actuation thereby to advance the carrying member; means moving with the gear of lower order to actuate the trip lever; manually controlled means to rotate the last-named gear while the pivoted frame is in its lower position; and means to rotate the cam after the pivoted frame has been swung back to its upper position.

17. In a calculating machine, in combination, a plurality of independently rotatable computing gears representing consecutive numerical orders and having a zero position; toothed reciprocatory actuating members to rotate the gears; means to shift the said gear into mesh with the actuating members before advance thereof and out of mesh therewith after advance; movable dogs, and means actuated thereby to arrest the advancing actuating members; dog-actuating devices, rotating with the gears to actuate the dogs as the gears reach the zero position and moving into the paths of the dogs as the gears are shifted into mesh with the actuating members.

18. In a calculating machine, in combination, a plurality of independently rotatable computing gears representing consecutive numerical orders and having a zero position; toothed reciprocatory and actuating members to rotate the gears; means to shift the said gears into mesh with the actuating members before advance thereof and out of mesh therewith after advance; movable normally locked dogs, and means actuated thereby to arrest the advancing actuating members; means to unlock the dogs before advance of the actuating members; and toothed disks rotating with the gears and movable therewith, as the gears are shifted into mesh with the actuating members, to bring the teeth of the disks into the paths of the dogs.

19. In a calculating machine, in combination, a plurality of independently rotatable computing gears representing consecutive numerical orders and having a zero position; toothed reciprocatory actuating members to rotate the gears; means to shift the said gears into mesh with the actuating members before advance thereof and out of mesh therewith after advance; ratchets connected with the actuating members to arrest the same; pawls to engage the ratchets and normally out of engagement therewith; dogs connected with the pawls to shift the same into engagement with the ratchets; and devices moving with the rotating gears to actuate the dogs and thereby cause the pawls to engage the ratchets and arrest the advancing actuating members and the rotating gears as the latter reach the zero position.

20. In a calculating machine, in combination, a plurality of independently rotatable computing gears representing consecutive numerical orders and having a zero position; toothed reciprocatory actuating members to rotate the gears; means to shift the said gears into mesh with the actuating members before advance thereof and out of mesh therewith after advance; a series of dogs, and mechanism actuated thereby to arrest the advancing actuating members while the gears are in mesh therewith; means actuated by the gears to advance the dogs, and thereby actuate the arresting mechanisms, when the gears reach the zero position; a series of fingers normally locking the dogs to prevent advance thereof; and means for rocking the fingers to permit advance of the dogs before advance of the actuating members and for retracting the fingers to retract and lock the dogs after arrest of the actuating members.

21. In a calculating machine, the combination of a series of toothed actuating members arranged side by side; a shaft extending across the actuating members; a series of computing gears rotatably mounted side by side on the shaft; a pair of bell-crank levers supporting the shaft; a rock-shaft connected with the bell-crank levers to rock the same, whereby to shift the gears into and out of mesh with the actuating members; a lever connected with the rock-shaft to actuate the same; a swinging element having a locking device normally engaging the last-named lever to lock the same; means carried by the swinging element in advance of the locking device to actuate the last-named lever after the locking device is carried out of locking engagement therewith; and means to swing the said element.

22. In a calculating machine, in combination, a series of toothed reciprocatory actuating members arranged side by side; a series of computing gears extending across the actuating members; a pair of bell-cranks to shift the gears into and out of mesh with the actuating members; a reciprocatory link connected with the bell-cranks to rock the latter and having a lateral stud; a lever having a cam slot engaging the stud; means locking the lever before advance of the actuating members; means to actuate the lever before retraction of the actuating members; and means operable at will to shift the link transversely of its path of reciprocation before advance of the actuating members, whereby the resulting movement of the stud in the cam slot in the locked lever advances the link and thereby rocks the bell-cranks.

23. In a calculating machine, in combination, a series of toothed reciprocatory actuating members arranged side by side; a series of computing gears extending across the actuating members; a pair of bell-cranks to shift the gears into and out of mesh with the actuating members; a reciprocatory link connected with the bell-cranks to rock the same; a cam-lever to which the link is movably connected for actuation; means locking the cam-lever while the actuating members are advancing; means to rock the cam-lever before retraction of the actuating members; a movable element having an actuating rib; mechanism adapted to swing the link transversely of its path of reciprocation, and having a cam-finger to actuate the mechanism but normally out of the path of said rib; and manual means to shift the cam finger into the path of the rib.

24. In a calculating machine, in combination, a series of toothed reciprocatory actuating members; a series of computing gears extending across the actuating members; a pair of bell-cranks connected with the gears to shift the same into and out of mesh with the actuating members; a reciprocatory link connected with the bell cranks to rock the same; a cam-lever to which the link is movably connected for actuation; means to lock the cam-lever, only while the actuating members are advancing; means to rock the cam-lever and thereby rock the bell-cranks, after advance of the actuating members; manually actuated means to lock the cam-lever during advance and retraction of the actuating members; manually controlled mechanism to swing the link transversely of its path of reciprocation while the cam-lever is locked by either locking means, whereby to shift the gears into mesh with the actuating members before advance thereof; and automatic means to swing the link back to initial position before retraction of the actuating members and while the cam-lever is locked by the second-named locking means.

25. In a calculating machine, in combination, a series of toothed reciprocatory actuating members; a series of computing gears extending across the actuating members; a pair of bell-cranks connected with the gears to shift the same into and out of mesh with the actuating members; a reciprocatory link connected with the bell-cranks to rock the same; a cam with which the link is movably connected for actuation; means to hold the cam stationary during advance and retraction of the actuating members; means to swing the link transversely before advance of the actuating members, whereby the movement of the link relative to the cam will advance the link and rock the bell-cranks with consequent shifting of the gears into mesh with the actuating members; and means to swing the link back to initial position relatively to the stationary cam before retraction of the actuating members, with consequent retraction of the link and shifting of the gears out of mesh with the actuating members.

26. In a calculating machine, in combination, a series of toothed reciprocatory actuating members; a series of computing gears across the actuating members; a pair of bell-cranks connected with the gears to shift the same into and out of mesh with the actuating members; a reciprocatory link connected with the bell-cranks to rock the same; a cam held stationary during advance and retraction of the actuating members and connected with the link to reciprocate the latter when it is swung transversely of its path of reciprocation; means to swing the link in one direction before advance of the actuating members; means connected with the link to swing the same back to initial position, with consequent shifting of the gears out of mesh with the actuating members; a reciprocatory element to actuate said means; manual mechanism to shift the element into operative position with respect to the said means; and means to advance the element after advance of the actuating members and before retraction thereof.

27. In a calculating machine, in combination, a series of toothed reciprocatory actuating members arranged side by side; a series of computing gears extending across the actuating members; a reciprocatory link connected with the gears to shift the same into and out of mesh with the actuating members; a cam held stationary during advance and retraction of the actuating members and connected with the link to reciprocate the latter when the same is swung transversely of its path of reciprocation; means to swing the link in one direction; before advance of the actuating members, to shift the gears into mesh with the actuating members; a bell-crank having an arm connected with the link to swing the same back to initial position and thereby shift the gears out of mesh with the actuating members; a reciprocatory element to coöperate with the other arm of the bell-crank; and means to advance the said element after advance and before retraction of the actuating members and later retract said element.

28. In a calculating machine, in combination, a series of toothed reciprocatory actuating members arranged side by side; a series of computing gears extending across the actuating members; a reciprocatory link connected with the gears to shift the same into and out of mesh with the actuating members; a cam-lever to which the link is movably connected for actuation; an actuating lever and a link connecting the same with the cam-lever to actuate the latter; a movable element adjacent to the actuating lever and having actuating means to rock the latter after advance and before retraction of the actuating members; a locking member; manual means to shift the actuating lever out of the path of the actuating means and into coöperation with the locking member to hold a cam-lever stationary during advance and retraction of the actuating members; manually controlled means to swing the link relatively to the stationarily held cam-lever before advance of the actuating members; a bell-crank having an arm connected with the link to reverse its swing and thereby shift the gears out of mesh with the actuating members; a reciprocatory element to rock the bell-crank by engagement with its other arm and normally out of operative position relative to said other arm; mechanism actuated by the aforesaid manual means to shift the reciprocatory element into operative position; means actuated by the aforesaid movable element to advance the reciprocatory element after advance and before retraction of the actuating members and to later retract the reciprocatory element; and an actuating shaft connected with the aforesaid mechanism and movable element simultaneously; whereby the gears may be shifted into mesh with the actuating members after advance or before advance thereof, at will.

29. In a calculating machine, in combination, a plurality of independently rotatable computing gears representing consecutive numerical orders; toothed reciprocatory carrying members associated with the respective gears, and mechanisms to advance the carrying members independently of each other and each dependent for operation on the extent of rotation of the gear of the next lower order; mechanism to shift the gears into and out of mesh with the carrying members at appropriate times; a series of fingers associated with the carrying members to retract the same; a shaft connected with the fingers to actuate the same; and automatic means to actuate the shaft while the gears are out of mesh with the carrying members.

30. In a calculating machine, in combination, a plurality of independently rotatable computing gears representing consecutive numerical orders; toothed reciprocatory carrying members associated with the respective gears, and mechanisms for advancing the racks independently of each other and each dependent for operation on the extent of rotation of the gear of the next lower order; mechanism to shift the gears into and out of mesh with the carrying members at appropriate times; a rock-shaft in rear of the carrying members; a series of fingers fixed on the rock-shaft and coöperating with the respective carrying members to retract the same; and means for rocking the shaft to retract the carrying members while the gears are out of mesh therewith.

31. In a calculating machine, in combination, a plurality of independently rotatable computing gears representing consecutive numerical orders; a plurality of toothed carrying members associated with the respective gears, and mechanisms to advance the racks independently of each other and each dependent for operation upon the extent of rotation of the gear of next lower order; mechanism to shift the gears into and out of mesh with the carrying members; locking pawls on the carrying members; a series of movable fingers adapted to engage the pawls to hold the carrying members; means enabling the fingers to retract the carrying members; and means operating to shift the fingers to engage and disengage the pawls and to retract the carrying members.

32. In a calculating machine, in combination, a plurality of independently rotatable computing gears; a plurality of toothed reciprocatory carrying members associated with the respective gears, and mechanisms to advance the respective carrying members independently of each other and each dependent for operation upon the extent of rotation of the gear of next lower order; mechanism to shift the gears into and out of mesh with the carrying members at appropriate times; a series of movable fingers coöperating with the carrying members to retract the same; a rock-shaft connected with the fingers to actuate the same; an actuating finger on the shaft; a reciprocatory hooked-member adapted to engage and rock the actuating finger in one direction; and means to rock the shaft and actuating finger in the other direction.

33. In a calculating machine, in combination, a plurality of independently rotatable computing gears representing consecutive numerical orders; a plurality of toothed reciprocatory carrying members associated with the respective gears; mechanisms to advance the carrying members independently of each other and each dependent for operation upon the extent of rotation of the gear of next lower order; levers connected with the gears to shift the same into and out of mesh with the carrying members at appropriate times; a series of movable fingers associated with the carrying members to retract the same, and a rock-shaft to actuate the fingers; an actuating finger on the shaft to rock the same; a reciprocatory hooked member normally out of engagement with the actuating finger; mechanism to actuate said levers and shift the hooked member into and out of operative position relative to the actuating finger; and means to reciprocate the hooked member after the same is shifted into said operative position.

34. In a calculating machine, in combination, a plurality of independently rotatable computing gears representing consecutive numerical orders; a plurality of toothed reciprocatory actuating members to rotate the gears; a plurality of reciprocatory toothed carrying members associated with the respective gears, and independently operable mechanism to advance the carrying members, each dependent for operation upon the extent of rotation of the gear of next lower order; levers connected with the gears to shift the same into mesh with the actuating members and out of mesh with the carrying members, and vice versa; reciprocatory links connected with the levers to actuate the same; a series of movable fingers associated with the carrying members to retract the same; a rock-shaft connected with the fingers to actuate the same; an actuating finger on the rock-shaft; a reciprocatory hooked member adapted to rock the actuating finger and connected with one of the aforesaid links for movement thereby into and out of position to engage and rock the actuating finger; and means to reciprocate the hooked member while the same is in position to engage the actuating finger.

35. In a calculating machine, in combination, a plurality of independently rotatable computing gears representing consecutive numerical orders; a plurality of toother reciprocatory carrying members associated with the respective gears; means to shift the gears into and out of mesh with the carrying members; independently operable mechanisms to shift the carrying members in one direction, each dependent for operation upon the extent of rotation of the gear of next lower order; a plurality of fingers associated with the carrying members to shift the same in the opposite direction; a rock-shaft connected with the fingers to actuate the same; an actuating finger on the shaft to rock the same; a reciprocatory hooked member to rock the actuating finger; means to shift the hooked member into and out of operative position relative to the actuating finger and simultaneously shift the gears relatively to the carrying members to move the gears into or out of mesh with the said carrying members; a lever connected with the hooked member to reciprocate the latter; and a cam associated with the lever to rock the same.

36. In a calculating machine, in combination, a plurality of reciprocatory carrying members, and independently operable mechanism to shift the carrying members in one direction; a series of fingers to shift the carrying members in the opposite direction; a rock-shaft connected with the fingers to actuate the same; oppositely extending actuating fingers on the shaft to rock the same in opposite directions; reciprocatory hooked members to rock the respective fingers, one of said hooked members being normally inoperative; mechanism to reciprocate both hooked members simultaneously; manual mechanism to render operative the normally inoperative hooked member; an arm connected with the rock-shaft to rock the same; a pair of opposed springs connected with the arm to actuate the same; and means actuated by the said manual mechanism to tension either spring and relax the other, at will.

37. In a calculating machine, in combination, a plurality of reciprocatory carrying members, and independently operable mechanism to shift the carrying members in one direction; a series of fingers associated with the carrying members to shift the latter in the opposite direction; a rock-shaft connected with the fingers to actuate the same; oppositely extending actuating fingers on the shaft to rock the same in opposite directions; reciprocatory hooked members to rock the actuating fingers, one of the hooked members being normally inoperative; an arm on the shaft to rock the same; a pair of opposed springs connected with the arm to rock the same in opposite directions; an element connected with the springs and shiftable in two directions, to tension either spring and relax the other; a link connected with the said element to shift the same; manual means to actuate the link; and means actuated by the link to render operative the normally inoperative hooked member; and means to reciprocate both hooked members simultaneously.

38. In a calculating machine, in combination, a plurality of reciprocatory carrying members, and independently operable mechanisms to shift said members in one direction; a series of fingers associated with said members to shift the same in the opposite direction; a rock-shaft connected with the fingers to actuate the same; oppositely extending actuating fingers to rock the shaft in opposite directions; reciprocatory hooked members to rock the fingers, one of the hooked members being normally inoperative; means to reciprocate both hooked members simultaneously; an arm on the shaft to rock the same in opposite directions; a pair of opposed springs connected with the arm to rock the latter in opposite directions; a link connected with the spring to tension either and relax the other; an arm connected with the normally inoperative hooked member to render the same operative, and vice versa, and connected with the aforesaid link for actuation thereby; a lever connected with the link to actuate the same; and a manually movable member to rock the lever.

39. In a calculating machine, in combination, a plurality of reciprocatory carrying members; independently operable mechanisms associated with the respective carrying members to shift the same independently of each other; a series of cams to actuate said mechanism; a shaft on which the cams are mounted; a pinion on the shaft to rotate the latter; a support carried by the shaft; a rack slidable in the support and meshing with the pinion to rotate the same; and a swinging arm connected with the rack to reciprocate the latter.

40. In a calculating machine, in combination, a plurality of reciprocatory carrying members; independently operable mechanisms associated with the respective carrying members to shift the same independently of each other; a series of cams to actuate said mechanisms; a shaft on which the cams are mounted; a reciprocatory element connected with the shaft to actuate the latter; a swinging link connected with the said element to reciprocate the same, and having a cam slot; and an oscillating member having a stud extending into the cam slot to swing the link as the said member oscillates.

41. In a calculating machine, in combination, a plurality of reciprocatory members; independently operable mechanisms to shift the carrying members independently of each other; a series of cams to actuate said mechanisms; a shaft on which the cams are mounted; a pinion on the shaft to rotate the same; a swinging support carried by the shaft; a rack slidable through the support and meshing with the pinion to rotate the latter; a swinging arm pivotally connected with the rack to reciprocate the same and thereby rotate the cam-shaft and the cams thereon; a swinging link connected with the arm to swing the same and having a cam slot; and an oscillating element having a stud extending into the cam slot to swing said link as the element oscillates.

42. In a calculating machine, in combination, a plurality of independently reciprocatory carrying members; a plurality of pairs of cams associated with the carrying members to actuate the same, one cam of each pair to shift the associated member in one direction and the other to shift the member in the opposite direction; a shaft carrying the pairs of cams and holding the same with one cam of each pair in operative position and the other out of operative position; means to actuate the shaft; and manual means for shifting the cam shaft axially, to move the one cam of each pair out of, and the other into, operative position.

43. In a calculating machine, in combination, a plurality of independently reciprocatory carrying members; a series of pairs of cams associated with the carrying members to shift the same in opposite directions, one cam of each pair being normally in and the other out of operative position; and means for shifting the series of cams to move the normally operative cams into inoperative position and the others into operative position.

44. In a calculating machine, in combination, a plurality of independently reciprocatory carrying members; a series of pairs of cams to shift the carrying members in opposite directions, one cam of each pair being normally operative and the other normally inoperative and the series being shiftable to render the normally operative cams inoperative and the others operative; a lever connected with the series of cams to shift the same; a cam connected with the lever to rock the same; and manual means to actuate the cam.

45. In a calculating machine, in combination, a plurality of independently reciprocatory carrying members; a series of pairs of cams to shift the members in opposite directions; a shaft on which the cams are mounted for actuation; a bell-crank having an arm connected with the shaft to shift the same and the cams axially; a lever having a cam slot engaging the other arm of the bell-crank to rock the same; and a manually actuated cam coöperating with the lever to actuate the same.

46. In an adding and substracting machine, in combination, a plurality of independently rotatable gears representing consecutive numerical orders and having a zero position; means to rotate the gears in one direction for adding and in the other direction for clearing and for substracting; a series of shiftable dogs to arrest the gears at the zero position when the gears are rotated in the clearing direction; devices actuated by the rotating gears to engage and shift the dogs in the clearing operation and adapted to pass the dogs idly as the gears rotate in the adding direction; spring-actuated mechanism to shift the dogs into operative position relative to the said devices; locking members holding the devices in inoperative position and releasable at each adding, clearing, or subtracting operation of the machine; and manual means to prevent operation of the said spring actuated mechanism, whereby to prevent shifting of the dogs into operative position and consequent arrest of the gears at the zero position in the subtracting operation.

47. In an adding and subtracting machine, in combination, a plurality of independently rotatable gears representing consecutive numerical orders and having a zero position; means to rotate the gears in one direction for adding and in the other for subtracting and for clearing; a series of dogs to arrest the gears at the zero position when the gears are rotated in the clearing direction; the dogs being normally in inoperative position; a series of ratchets rotating with the gears to actuate the dogs when the gears are rotated in the clearing direction and adapted to pass the dogs idly when the gears are rotated in the adding direction; spring-actuating mechanism for shifting the dogs into operative position; locking fingers to restore the dogs to and to lock the same in inoperative position; means operating at each adding, clearing, or subtracting operation of the machine to shift the fingers out of locking engagement with the dogs; and manual means operable at will to prevent operation of the spring-actuated mechanism, whereby to prevent arrest of the gears at the zero position in the subtracting operation.

48. In an adding and subtracting machine, in combination, a plurality of independently rotatable gears representing consecutive numerical orders and having a zero position; means to rotate the gears in one direction for adding and in the other direction for clearing and for subtracting; a plurality of independently reciprocatory carrying members associated with the gears; mechanisms, including an axially shiftable series of cams, to shift the carrying members in opposite directions in the adding and subtracting operations of the machine, mechanisms to shift the cams axially; a series of dogs to arrest the gears at the zero position in the clearing operation, the dogs being normally out of but shiftable into operative position; devices moving with the gears to actuate the dogs when the gears are rotated in the clearing operation and adapted to pass the dogs idly in the adding operation; spring-actuated mechanism to shift the dogs into operative position; locking devices normally holding the dogs in inoperative position and releasable from the dogs at each adding, clearing, or subtracting operation of the machine; means to prevent operation of the spring-actuated mechanism; and manually actuated mechanism to operate the last named means and the cam-shifting mechanism.

49. In a calculating machine, adapted to subtract numbers, in combination, a plurality of independently rotatable gears representing consecutive numerical orders and having a zero position; means to rotate the gears in the same direction for subtracting and for clearing; a series of dogs to arrest the gears at the zero position; devices moving with the gears to actuate the dogs; spring-actuated mechanism to shift the dogs into operative position relative to the said devices; a series of fingers locking the dogs in inoperative position; a shaft on which the fingers are fixed; means to rock the shaft at each clearing or subtracting operation; a stop-finger on the shaft; a shiftable stop normally out of the path of the finger; and manually operated means to shift the stop into the path of the finger and thereby prevent rocking of the shaft.

50. In a calculating machine, in combination, a plurality of toothed independently reciprocating actuating members; a plurality of independently rotatable computing gears having a zero position and normally out of mesh with the actuating members; an element connected with the gears, advanceable to shift the same into and retractable to shift the same out of mesh with the actuating members; a stationary cam connected with the element to advance and retract the element when the same is shifted transversely; manually controlled means operating before advance of the actuating members to shift the element transversely in one direction to advance the said element; mechanism to arrest the actuating members and the gears when the latter are rotated to the zero position by the advancing actuating members; and automatic mechanism operating after retraction of the actuating members to shift the said element transversely in the direction opposite to the first-named direction.

51. In a calculating machine, in combination, a plurality of toothed independently reciprocatory actuating members; a plurality of independently rotatable computing gears having a zero position and normally out of mesh with the actuating members; a link connected with the gears, advanceable to and retractable to shift the gears into and out of mesh with the actuating members; a cam having a cam slot engaged by the link and inclined to the path of advance and retraction thereof; manually controlled means operating before the advance of the actuating members to swing the link in one direction relative to the cam to advance the link and thereby shift the gears into mesh with the actuating members; means to arrest the actuating members and the gears when the latter are rotated to the zero position by the advancing actuating members; and automatic means operating after retraction of the actuating members to swing the link in the opposite direction relative to the cam to retract the link and thereby shift the gears out of mesh with the actuating members.

52. In a calculating machine, in combination, a plurality of toothed independently reciprocatory actuating members; a plurality of independently rotatable computing gears having a zero position and normally out of mesh with the actuating members; a link connected with the gears, advanceable and retractable to shift the gears into and out of mesh with the actuating members; a cam connected with the link; a lever connected with the cam to lock the same; manually controlled means operating before advance of the actuating members to swing the link in one direction relative to the cam to advance the link and thereby shift the gears into mesh with the actuating members and thereafter lock the lever; an oscillatory member; a lever connected with the link to swing the same back to initial position; and means carried by the oscillatory member to engage and actuate the last named lever after retraction of the actuating members.

53. In a calculating machine, in combination, a plurality of toothed independently reciprocatory actuating members; a plurality of independently rotatable computing gears having a zero position and normally out of mesh with the actuating members; an element connected with the gears, advanceable and retractable longitudinally to shift the gears into and out of mesh with the actuating members; a cam-lever having connection with the element to advance and retract the same when the cam-lever is locked and the element is shifted transversely; a locking lever connected with the cam lever to lock the same; a locking member; a pivoted member on which the locking lever is fulcrumed; a toggle connected with the pivotal member to swing the same; manually controlled means to buckle and straighten the toggle and thereby carry the locking lever into and out of engagement with the locking member; means to shift the aforesaid element transversely; and mechanism to arrest the actuating members and the gears when the latter are rotated to the zero position by the advancing actuating members.

54. In a calculating machine, in combination, a plurality of toothed normally locked actuating members reciprocating independently of each other; manual means to unlock said members; a plurality of independently rotatable computing gears having a zero position and normally out of mesh with the actuating members; a link connected with the gears and advanceable and retractable to shift the gears into and out of mesh with the actuating members; a cam connected with the link to advance and retract the link when the link is swung transversely; a cam-locking lever connected with the cam to hold the same stationary while the link is being swung transversely; an oscillatory element having a locking device normally engaging the lever to lock the same and the cam; a stationary locking member; means controlled by the aforesaid manual means to swing the link in one direction while the locking lever is locked by said locking device; mechanism actuated by the last named means to shift the locking lever out of engagement with said locking device and into engagement with the stationary locking member; and means carried by the oscillatory member to swing the link back to initial position while the cam-locking lever is locked by said stationary device; and mechanism to arrest the actuating members and the gears when the latter are rotated to the zero position by the advancing actuating members.

In testimony whereof I hereunto affix my signature.

AUGUST KNISTROM.